(12) United States Patent
Fujii

(10) Patent No.: US 7,937,437 B2
(45) Date of Patent: May 3, 2011

(54) METHOD AND APPARATUS FOR PROCESSING A REQUEST USING PROXY SERVERS

(75) Inventor: Hiroshi Fujii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 162 days.

(21) Appl. No.: 12/366,759

(22) Filed: Feb. 6, 2009

(65) Prior Publication Data

US 2010/0042675 A1 Feb. 18, 2010

(30) Foreign Application Priority Data

Aug. 12, 2008 (JP) ................................. 2008-207704

(51) Int. Cl.
*G06F 15/16* (2006.01)
(52) U.S. Cl. ........ 709/203; 709/217; 709/218; 709/219; 709/223; 709/225; 709/226; 709/227; 709/228; 709/229; 718/105
(58) Field of Classification Search .................. 709/203, 709/217–219, 223–229; 718/105
See application file for complete search history.

(56) References Cited

U.S. PATENT DOCUMENTS

| | | | | |
|---|---|---|---|---|
| 6,003,083 | A * | 12/1999 | Davies et al. ................. | 709/226 |
| 6,557,024 | B1 * | 4/2003 | Saito et al. .................... | 709/201 |
| 6,868,448 | B1 * | 3/2005 | Gupta et al. .................. | 709/226 |
| 7,254,621 | B2 * | 8/2007 | Singhal et al. ................ | 709/218 |
| 7,254,636 | B1 * | 8/2007 | O'Toole et al. ............... | 709/230 |
| 2002/0087721 | A1 * | 7/2002 | Sato et al. ..................... | 709/238 |
| 2004/0039827 | A1 * | 2/2004 | Thomas et al. ............... | 709/228 |
| 2005/0022203 | A1 * | 1/2005 | Zisapel et al. ................ | 718/105 |
| 2005/0193281 | A1 * | 9/2005 | Ide et al. .......................... | 714/47 |
| 2005/0198206 | A1 * | 9/2005 | Miller et al. .................. | 709/219 |
| 2006/0101153 | A1 * | 5/2006 | Boucher et al. ............... | 709/232 |
| 2008/0127199 | A1 * | 5/2008 | Miki ............................. | 718/105 |
| 2008/0282254 | A1 * | 11/2008 | Blander et al. ................ | 718/105 |
| 2009/0182843 | A1 * | 7/2009 | Hluchyj et al. ............... | 709/219 |
| 2009/0327113 | A1 * | 12/2009 | Lee et al. ........................ | 705/34 |
| 2010/0030862 | A1 * | 2/2010 | Chen et al. .................... | 709/206 |

FOREIGN PATENT DOCUMENTS

| | | | |
|---|---|---|---|
| JP | 2004-030204 | | 1/2004 |
| JP | 2004030204 | A * | 1/2004 |
| JP | 2007-316837 | A | 12/2007 |

* cited by examiner

*Primary Examiner* — Alina N. Boutah
(74) *Attorney, Agent, or Firm* — Kilpatrick Townsend & Stockton LLP

(57) ABSTRACT

Provided is a request processing method of processing a request requesting task processing in a computer system including the steps of: transmitting, by a proxy server, a first requests which is one of duplicate and original requests to application servers; transmitting, by the application servers, a result of processing of the first requests to the proxy server; notifying, by the application servers, a session management server of session information including identifiers of the application servers and identifiers of the first requests; determining, by the proxy server, a result of the processing used for responding to a client computer upon receiving the result of the processing of the first requests; and notifying, by the proxy server, the session management server of the identifiers of the application servers which have transmitted the determined processing result and an identifier of the request transmitted from the client computer.

9 Claims, 17 Drawing Sheets

PHYSICAL COMPUTER 1

| VIRTUAL COMPUTER NUMBER | SERVER ADDRESS |
|---|---|
| 1 | server A |
| 2 | server B |
| 3 | server C |

N1 = 3

PHYSICAL COMPUTER 2

| VIRTUAL COMPUTER NUMBER | SERVER ADDRESS |
|---|---|
| 1 | server D |
| 2 | server E |

N2 = 2

PHYSICAL COMPUTER 3

| VIRTUAL COMPUTER NUMBER | SERVER ADDRESS |
|---|---|
| 1 | server F |
| 2 | server G |

N3 = 2

M=6 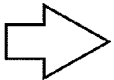

TABLE T1

| SERVER ADDRESS |
|---|
| server A |
| server B |
| server C |
| server A |
| server B |
| server C |

TABLE T2

| SERVER ADDRESS |
|---|
| server D |
| server E |
| server D |
| server E |
| server D |
| server E |

TABLE T3

| SERVER ADDRESS |
|---|
| server F |
| server G |
| server F |
| server G |
| server F |
| server G |

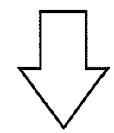

TABLE S

| SERVER ADDRESS |
|---|
| server A |
| server D |
| server F |
| server B |
| server E |
| server G |
| server C |
| server D |
| server F |
| server A |
| server E |
| server G |
| server B |
| server D |
| server F |
| server C |
| server E |
| server G |

*FIG. 11*

METHOD AND APPARATUS FOR PROCESSING A REQUEST USING PROXY SERVERS

CLAIM OF PRIORITY

The present application claims priority from Japanese patent application 2008-207704 filed on Aug. 12, 2008, the content of which is hereby incorporated by reference into this application.

BACKGROUND OF THE INVENTION

This invention relates to a technology of producing duplicate requests from a received request, and executing the duplicate requests on a plurality of computers.

As the Internet technology has matured recently, business systems have been widely made into Web applications. For Web application servers (hereinafter, referred to as AP servers) providing basis for executing user application programs (hereinafter, referred to as user AP's) realized by the Web applications, high performance and reliability are requested.

Presently, as a technology for enhancing performance of a system, there is proposed a system building method employing a load balancer. In the system employing the load balancer, a plurality of application servers which can execute the same applications are provided, and receive processing requests via the load balancer.

The load balancer selects, based on a load state, an application server which processes the request. By preventing a load from concentrating on a certain application server, response performance of the system is increased.

The load balancer usually monitors failure information of the application servers provided on a subsequent stage, and selects application servers while avoiding failed application servers. By redundancy realized by this hot standby, it is possible to increase the availability of the service.

However, in the redundancy realized by the hot standby, when an application server fails during the processing of a request, the request under processing receives an error or no response. The conventional load balancer cannot recover the generated error.

JP 2004-030204 A discloses, in order to solve this problem, a technology of dividing servers into a plurality of groups of a plurality of servers provided on a subsequent stage of a load balancer, producing, from a received request, duplicate requests on a load balancer, and causing the plurality of servers to process the duplicate requests in parallel.

In the technology, in order to cause the servers to process the duplicate requests in parallel, the servers are first caused to process the request as "tentative execution". A server from which the load balancer receives a response from the "tentative execution" for the first time carries out "real execution", and finally responds. The other servers carry out "execution cancellation". A series of technologies including the "tentative execution", the "real execution", and the "execution cancellation" are generally referred to as transaction processing, and are mounted on a database server and the like in order to maintain consistency in a system.

According to the technology disclosed in JP 2004-030204 A, the processing carried out by the servers provided on the subsequent stage of the load balancer is made into redundant processing, and, even when one server fails, other servers are carrying out response processing to the same request, and hence the system as a whole can continue the processing. In this way, it is possible to realize a system having stable response performance without exerting influence of a failure of a server inside the system on the outside of the system.

A description will also be given of a technology for realizing a redundant configuration. As the performance of servers has recently been increased, a virtual computer technology has been remarkably developed. Consequently, it is possible to run a plurality of virtual computers on the same physical computer.

A virtual computer of so-called hypervisor type can, without necessity of an OS (host OS) for operating virtual computers, provide a function for sharing a resource layer of the physical computer, and can operate a plurality of different OS'es in parallel.

When a system redundantly configured is realized, the method of using a plurality of virtual computers is excellent in cost such as management and operation costs, space saving, and low power consumption compared with a method of using a plurality of physical computers.

For a business system realized by a Web application, there is required a mechanism of maintaining, on a server, session information for executing a single task processing as a flow of a plurality of requests and responses and realizing an application including a screen transition. As the mechanism for maintaining the session information on the server, the sticky function is generally used.

In the sticky function, a load balancer analyzes session information, and, when a certain session ID is transmitted, and thus, a processing server is to be selected, searches for a record of a server which has processed the same session ID, thereby always selecting the same server for this session ID.

However, when the sticky function is used, the load balancer cannot exhibit the load balancing function, and the optimum performance is not realized in the system as a whole.

Moreover, when a session is fixed to only a single server which can process a necessary request, the dependency of the request on the server increases. As a result, the continuity of the system cannot be guaranteed upon a failure of a single server machine. This still holds true for the technology disclosed in JP 2004-030204 A.

As a solution for this problem, a session management method employing a shared external database machine and the like is known. The session information is recorded on an external database different from the server which processes a request, and is shared among all the servers.

The method of managing the session information on the external database is inferior to the sticky function in performance. However, generally, high performance is realized at low cost as the performance of hardware device increases. When high reliability is required, it is desirable to uniformly share a session among servers.

A description will now be given of a problem of a session collision which occurs when, from a request, duplicate requests are produced. Usually, session information is uniquely managed according to an identifier (ID) inside a system, and hence requests having the same session ID are not processed in parallel. Therefore, for the same session ID, a plurality of requests for session registration are not generated.

However, when duplicate requests are produced from a request, there may be a case in which a plurality of pieces of "session information for the same request" are registered from a plurality of application servers to a client computer, and can be referred to. When the plurality of pieces of session information are registered, and contents thereof are different, it is necessary to properly select information to be referred to.

When the selection fails, inconsistency may arise in the system. This problem is referred to as "problem of session collision".

The problem of the session collision is caused by a fact that "when the same user application program receives the same request, it is not guaranteed that the same session information is produced". As a typical example thereof, a description will now be given of a lottery system.

In the lottery system, according to a random number generated by an application, a "win" or a "blank" is drawn. Therefore, when the same request is processed on a plurality of application servers, it is not guaranteed that all results of the processing are the same. In a case of "win" and in a case of "blank", different pieces of session information are generally produced with a high probability.

As another example, a description will now be given of a ticket reservation system including processing for determining a deadline. In the processing for determining a deadline in the ticket reservation system, when "the present time of an application server" is used as the reference of the deadline, it is not guaranteed that the time referred to by determination processing is always the same for the respective duplicate requests. As a result, the processing of determining "whether the deadline has been reached or not" depends on the application server, and the session information produced by the respective application servers may vary.

According to the technology disclosed in JP 2004-030204 A, when duplicate requests are produced from a request, the sticky function can be realized. This is carried out in consideration of application to the session management, but the session management using the sticky function cannot solve the problem of the session collision.

Specifically, as a method for realizing the sticky function, when the "execution cancellation" is carried out, the session information is not deleted, but is held on the server. Then, when a request requiring this session information is received again, the request is directed to the same group of servers, thereby reusing the session information. In this case, if the produced session information varies depending on the servers, different pieces of information are managed by a pair of the servers, resulting in inconsistency in the system.

SUMMARY OF THE INVENTION

As described above, in order to produce duplicate requests in an application server system, a session management method capable of solving the session collision problem is necessary. It is therefore an object of this invention to realize a system for producing duplicate requests without the session collision problem in an application server system.

The present invention proposes, assuming that processing performance of a computer increases as technologies progress, resulting in a reduction in costs, a system built in consideration of an aspect that "how much the performance can be increased with a small amount of computer resources" as well as an aspect that "the processing performance and the reliability are increased by utilizing surplus computer resources".

A representative aspect of this invention is as follows. That is, there is provided a request processing method of processing a request requesting task processing in a computer system. The computer system has a client computer for transmitting the request requesting task processing, a plurality of application servers for processing the request, a proxy server for receiving the request and transmitting the request to the plurality of application servers, and a session management server for managing the request. The proxy server has a first interface, a first processor coupled to the first interface, and a first memory coupled to the first processor. The plurality of application servers each has a second interface, a second processor coupled to the second interface, and a second memory coupled to the second processor. The request processing method includes the steps of: producing, by the proxy server, at least one duplicate request from an original request transmitted from the client computer, and transmitting the first request which is one of duplicate and original requests to each of the plurality of application servers; transmitting, by the plurality of application servers, a result of processing of the first requests to the proxy server; notifying, by the plurality of application servers, the session management server of session information including identifiers of the plurality of application servers and identifiers of the first requests; determining, by the proxy server, a result of the processing used for responding to the client computer upon receiving the result of the processing of the first requests; and notifying, by the proxy server, the session management server of the identifiers of the plurality of application servers which have transmitted the determined processing result and an identifier of the request transmitted from the client computer.

According to the representative aspect of this invention, it is possible to solve the problem of the session collision which occurs when a request sent from a client computer is made into duplicate requests, and the duplicate requests are processed by respective application servers.

BRIEF DESCRIPTION OF THE DRAWINGS

The present invention can be appreciated by the description which follows in conjunction with the following figures, wherein:

FIG. 11 is an explanatory diagram illustrating an example of producing a uniform-distribution-to-physical-computer table according to the third embodiment of this invention;

DETAILED DESCRIPTION OF THE PREFERRED EMBODIMENTS

Figure 1:
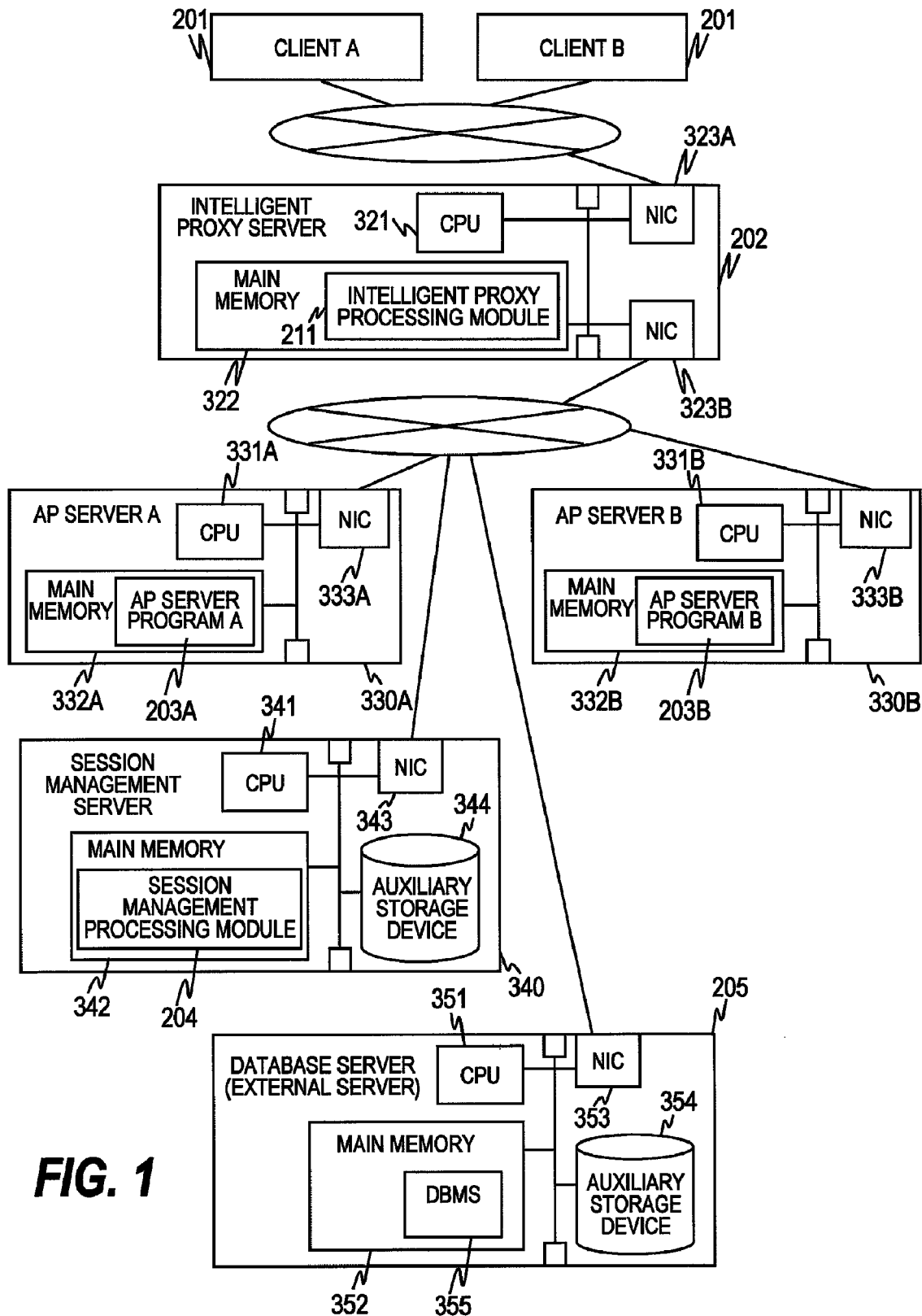
FIG. 1 is a block diagram illustrating a physical configuration of a computer system according to a first embodiment of this invention.

According to this invention, duplicate requests are produced from a request, and are then processed, and thus, when the request of the processing target includes update processing, an inconsistency may be generated as a result of the update processing carried out twice. Before a specific description of embodiments of this invention, a description will now be given of this problem.

In general, in an application server system, a sequence of processing of a request includes processing such as making access to a system external to an application server, such as a database server, thereby acquiring information, or updating contents of the external system. Of the accesses to an external system, an access for referring to a value is defined as "reference-type access", and an access for updating a value is defined as "update-type access".

When duplicate requests are produced from an original single request, a plurality of external accesses are carried out. When the respective requests are entirely the reference-type accesses, an inconsistency will never occur in the system. However, when the respective requests are the update-type accesses, update requests, which would not occur if duplicate requests are not produced from the original single request, are generated, and hence an "inconsistency problem caused by update-type accesses", in which data of the external system is updated in an unauthorized manner, will possibly occur.

As an example of the inconsistency problem caused by update-type accesses, a description will now be given of an inventory management system for the Internet shopping. A database system external to an application server program 203 stores the amount of articles in the inventory. In a user application 216, processing of executing, upon a reception of a request notifying purchase of the article, purchasing the article, and decrementing the amount of stock by one is described.

When a request for decrementing the amount of stock by one is input to the inventory management system, and when duplicate requests are not produced from the request, the amount of stock in the database server is decremented by one. However, two duplicate requests are produced, from two user application programs running in parallel, the requests for "reducing the amount of stock by one" are sent to the database server. On this occasion, the amount of the stock is decremented by two in the database server, which is different from the expected result. In this way, the user application program which makes an update-type access to an external system may bring about an unexpected result due to duplicate requests.

The technology disclosed in JP 2004-030204 A intends to solve the "inconsistency problem caused by update-type accesses" by implementing, on a server, the transaction processing by means of "tentative execution", "real execution", and "execution cancellation".

On the application server, functions such as the Java transaction API are implemented as a technology for providing transaction processing on a Web application executed in the application server. However, the application server does not generally have a function of providing a request directed to the application server itself with transaction processing, and presence/absence of this function depends on the design of the Web application.

Moreover, in information on a URL string used as an input to the application server, the URL string itself does not generally indicate absence/presence of an update-type access, and thus, there is no clue for determining whether the transaction processing is necessary. Thus, when the technology disclosed in JP 2004-030204 A is applied to the application server system, except for a case in which the necessity of the transaction processing can be determined according to a URL string, it is necessary to apply the transaction processing to all requests. The transaction processing requires control on a large amount of buffers for exclusive control processing and recording contents of sequence of the transaction processing from the start to the end thereof, and thus generally imposes a high load.

On the other hand, as a characteristic specific to the application server system, in terms of the frequency of generation of the "reference-type access" and the "update-type access" in the application server system, most of processing includes only the "reference-type access". The ratio of the frequency of generation of the "reference-type access" to the frequency of generation of the "update-type access" is said to be 99:1 or even 300:1.

The application of the technology disclosed in JP 2004-030204 A to the application server system has a large demerit in terms of the performance.

This invention adds, as a solution for the inconsistency problem caused by update-type accesses, to an intelligent proxy processing module or an application server, processing of determining the degree of redundancy of the duplicate requests according to "whether or not an update-type request is to occur". Specifically, on a timing when possibility of the inconsistency problem caused by update-type accesses is generated, pruning is carried out for duplicate requests. A detailed description will later be given of processing steps referring to FIG. 5.

As a result of the above-mentioned processing, when, in an application server system carrying out processing in cooperation with an external system, duplicate requests are produced, it is possible to avoid the inconsistency problem such as a double update due to update-type accesses.

A description will now be given of the embodiments of this invention for solving the above-mentioned "session collision problem" and "inconsistency problem caused by update-type accesses" referring to drawings.

First Embodiment

FIG. 1 is a block diagram illustrating a physical configuration of a computer system according to a first embodiment of this invention.

The computer system according to the first embodiment of this invention includes client computers 201, an intelligent proxy server 202, application servers 330, a session management server 340, and a database server (external server) 205.

The client computer 201 couples to the intelligent proxy server 202 via a network. Moreover, the application servers 330, the session management server 340, and the database server 205 are coupled to the intelligent proxy server 202 via a network. The client computer 201 makes access, via the intelligent proxy server 202, to the application servers 330, the session management server 340, and the database server 205.

The client computer 201 receives a request for executing task processing from a user, and transmits a request to the application server 330 via the intelligent proxy server 202. According to the first embodiment of this invention, the number of client computers 201 may be one or more, and two client computers 201 are illustrated in FIG. 1

The intelligent proxy server 202 is a so-called load balancer, and distributes requests transmitted from the client computers 201 among the application servers 330. The intelligent proxy server 202 produces, from a received request, duplicate requests, and transmits the respective duplicate requests to different application servers 330.

The intelligent proxy server 202 includes a CPU 321, a main memory 322, a network interface card (NIC) 323A, and a NIC 323B.

The CPU 321 executes programs stored in the main memory 322 to execute various types of processing. The main memory 322 stores the programs executed by the CPU 321, and data required for processing. For example, the main memory 322 stores an intelligent proxy processing module 211 for distributing duplicate requests produced from a received request among the application servers 330. The intelligent proxy processing module 211 produces, from a request transmitted from the client computer 201, duplicate requests, selects application servers 330 for processing the duplicate requests, and distributes the requests to the respective selected application servers 330. The intelligent proxy processing module 211 will be detailed later.

The NIC 323A is coupled to the client computers 201 via the network. The NIC 323B is coupled, via the network, to the application servers 330, the session management server 340, and the database server 205.

The application server 330 processes a request transmitted from the client computer 201, and transmits a result of the processing to the client computer 201. A plurality of application servers 330 are provided in the computer system. The application servers 330 respectively process duplicate requests produced by the intelligent proxy server 202. When a description is given of contents common to the respective application servers, the general reference numeral 330 is used, and when a description is given while referring to the individual application servers, reference numerals "330A", "330B", and the like are used. Moreover, the same convention is applied to components such as a program constituting the application server.

The application server 330 includes a CPU 331, a main memory 332, and a NIC 333. The CPU 331 executes programs stored in the main memory 332 to execute various types of processing. The main memory 332 stores the programs executed by the CPU 331, and data required for processing. For example, the main memory 332 stores the application server program 203 for processing a request transmitted from the client computer 201. The NIC 333 is coupled to the network.

The session management server 340 manages a session between the client computer 201 and the application server 330. The session management server 340 includes a CPU 341, a main memory 342, a NIC 343, and an auxiliary storage device 344.

The CPU 341 executes programs stored in the main memory 342 to execute various types of processing. The main memory 342 stores the programs executed by the CPU 341, and data required for processing. Specifically, the main memory 342 stores a session management processing module 204 which manages a session. The NIC 343 is coupled to the network. The auxiliary storage device 344 stores session information on a non-volatile memory medium.

The database server 205 stores data used by the application servers 330 for task processing and the like. The database server 205 includes a CPU 351, a main memory 352, a NIC 353, and an auxiliary storage device 354.

The CPU 351 executes programs stored in the main memory 352 to execute various types of processing. The main memory 352 stores the programs executed by the CPU 351, and data required for processing. Specifically, the main memory 352 stores a database management system (DBMS) 355 for managing data. The NIC 353 is coupled to the network. The auxiliary storage device 354 stores data used for task processing. In FIG. 1, the database server 205 is contained in the computer system as an external server, but the external server may be a server different from the DB server.

A description will now be given of an overview of a sequence in which, in order to avoid the session collision problem, the intelligent proxy processing module 211 and the session management processing module 204 communicate with each other, and the intelligent proxy processing module 211 controls registration of a session in the session management processing module 204.

Session information is recorded to a buffer of the session management processing module 204, and is managed to avoid a session collision. When the intelligent proxy processing module 211 finally determines a request to be transmitted to the client computer 201, session information corresponding to this request is recorded in a session storage database.

Figure 2:
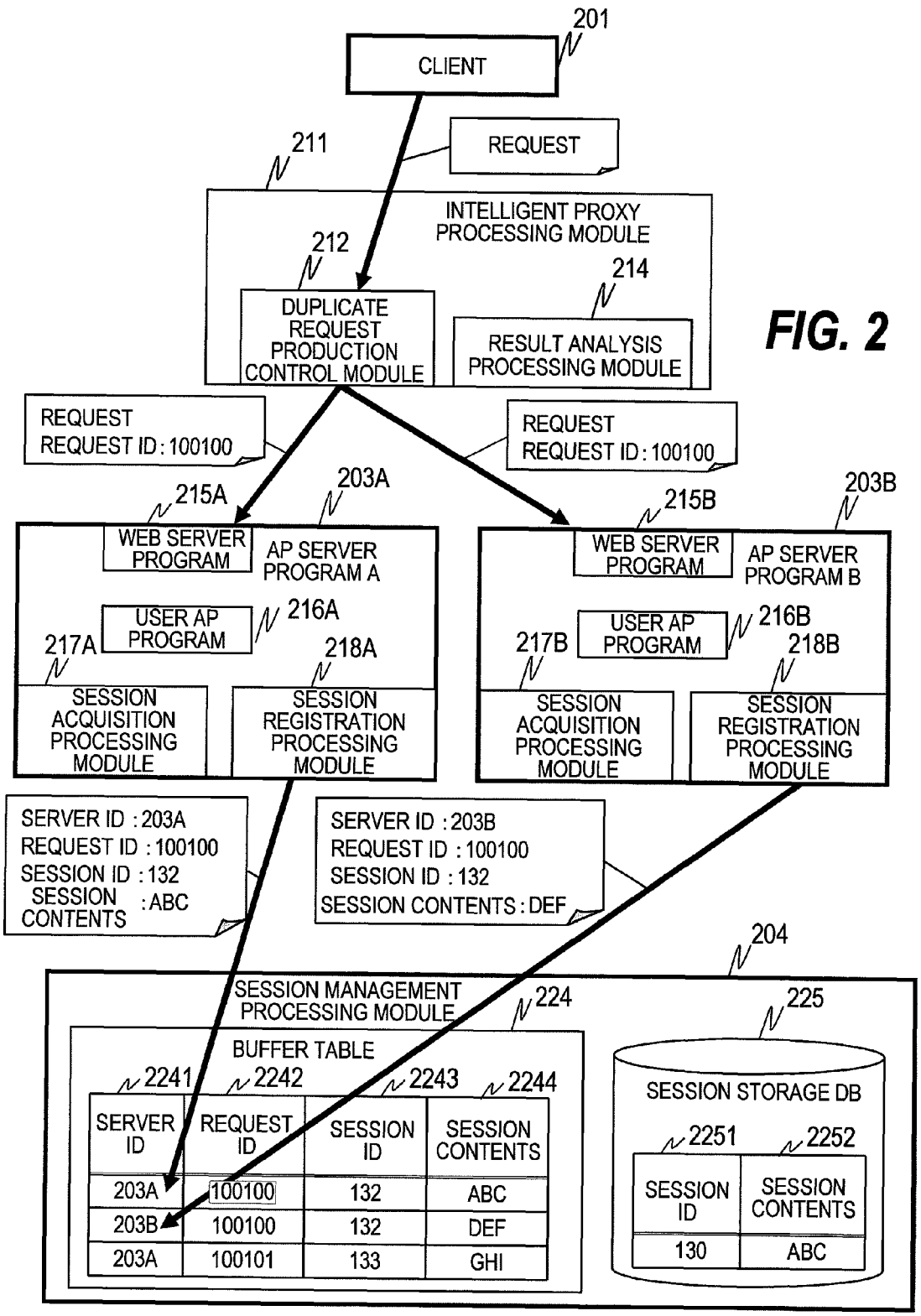
FIG. 2 is an explanatory diagram illustrating an overview of a session management and sequence of registering session information according to the first embodiment of this invention.

FIG. 2 illustrates an overview of the session management according to the first embodiment of this invention, and the sequence of registering session information.

The client computer 201, first, transmits a request containing a request for task processing to the intelligent proxy server 202. When the intelligent proxy server 202 receives the request transmitted by the client computer 201, the intelligent proxy server 202 causes the intelligent proxy processing module 211 to produce, from the received request, duplicate requests.

Moreover, the intelligent proxy processing module 211 includes a duplicate request production control module 212, and a result analysis processing module 214. The duplicate request production control module 212 produces, from a received request, duplicate requests, and assigns a common request ID to the produced duplicate requests. By assigning the common request ID, even when the plurality of duplicate requests are processed in parallel, it is possible to determine whether those duplicate requests are produced from the same request. A description will later be given of the result analysis processing module 214 for analyzing a result of processing of a plurality of duplicate requests.

The application server programs 203 process the duplicate requests. As illustrated in FIG. 2, the duplicate requests produced by the intelligent proxy processing module 211 are processed by the application server programs 203A and 203B.

The application server program 203A includes a Web server program 215A, a user application program 216A, a session acquisition processing module 217A, and a session registration processing module 218A. The application server program 203B is configured similarly.

The Web server 215A provides an interface for receiving a request for task processing transmitted by the client computer 201, thereby receiving a request transmitted by the client computer 201. The user application program 216A processes the request received by the Web server 215A. The session acquisition processing module 217A acquires a session registered to the session management processing module 204. The session registration processing module 218A registers a session established between the client computer 201 and the application server program 203A to the session management processing module 204.

Moreover, the application server program 203A causes the session registration processing module 218A to request the session management processing module 204 for the registration of a session. When the session registration processing module 218A carries out the session registration processing, the session registration processing module 218A notifies the session management processing module 204 of the session information as well as the server ID of an application server program 203 which has processed the request and the request ID of a request. In this way, based on information such as an address of the application server program 203, and a process ID and a thread ID with which the request has been processed, the server ID of the application server program 203 which has processed the request is configured so as to be uniquely identifiable. It should be noted that the session registration processing module 218B is configured similarly.

The session management processing module 204 includes a buffer table 224 and a session storage database 225.

The buffer table 224 temporarily stores session information. The buffer table 224 includes server ID's 2241, request ID's 2242, session ID's 2243 and session contents 2244.

The server ID 2241 is an identifier of the application server program 203. The request ID 2242 is an identifier of a request transmitted by the client computer 201, and a unique number or string.

The session ID 2243 is an identifier for identifying a flow of processing when a state transitions continuously as a request and a response are transmitted and received between the client computer 201 and the user application program 216. The session contents 2244 store information indicating a state of the session identified by the session ID 2243. In the following section, the session information implies a pair of a session ID and session contents.

The session storage database 225 stores the session information. The session storage database 225 contains session ID's 2251 and session contents 2252. The session storage database 225 records contents of a session in which the application server program 203 is selected by the intelligent proxy processing module 211 when duplicate requests are produced, and a response is actually transmitted to the client computer 201.

When the session management processing module 204 receives a session registration request, the session management processing module 204 first records information contained in the session registration request in the buffer table 224. On this occasion, duplicate requests can be distinguished according to combination of a server ID and a request ID, and thus, a session collision will not occur in the buffer table 224.

Figure 3:
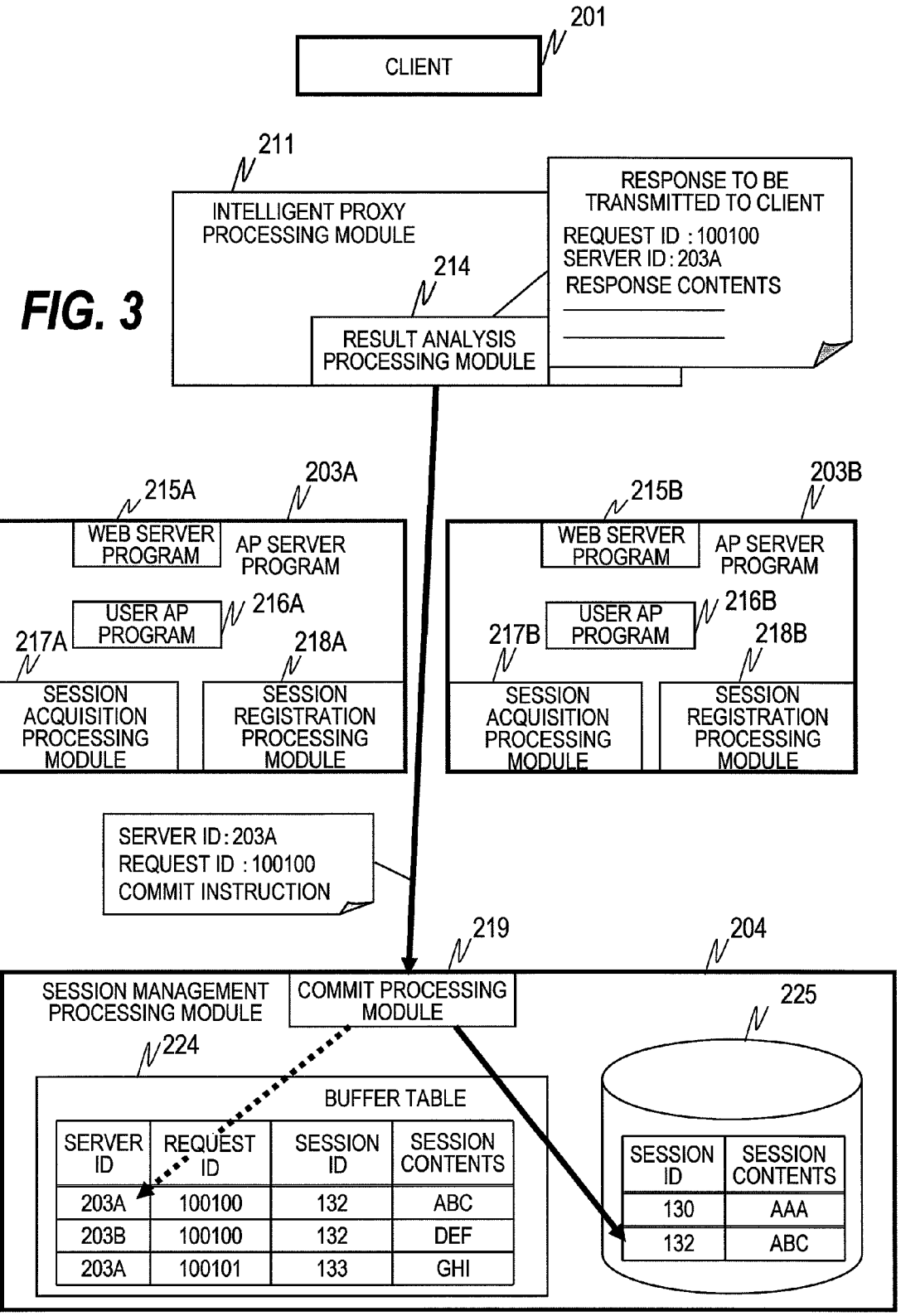
FIG. 3 is an explanatory diagram illustrating an overview of the session management and a sequence of transmission of a result of processing of a request to a client computer according to the first embodiment of this invention.

FIG. 3 illustrates an overview of the session management according to the first embodiment of this invention, and a sequence of transmission of a result of processing of a request to a client computer.

When the result analysis processing module 214 receives a result of processing of a request from the application server program 203, the result analysis processing module 214 finally determines a response returned to the client computer 201. When the result analysis processing module 214 finally determines a response returned to the client computer 201, the result analysis processing module 214 starts processing of registering, to the session storage database 225, session information corresponding to the application server program 203 which has returned the response. The intelligent proxy processing module 211 communicates with the session management processing module 204, thereby notifying a commit processing module 219 of the session management processing module 204 of an identifier for identifying the application server program 203, which has processed the request adopted as the final response, and request contents. A specific description of the processing will later be given referring to FIG. 4.

When the commit processing module 219 receives the registration request for registering the session information to the session storage database 225, the commit processing module 219, based on the received identifier, searches records in the buffer table 224, and registers data contained in a searched record to the session storage database 225. Moreover, the commit processing module 219 deletes all records which are recorded in the buffer table 224 and have the same request ID. A description will later be given of specific contents of the processing.

Figure 4:
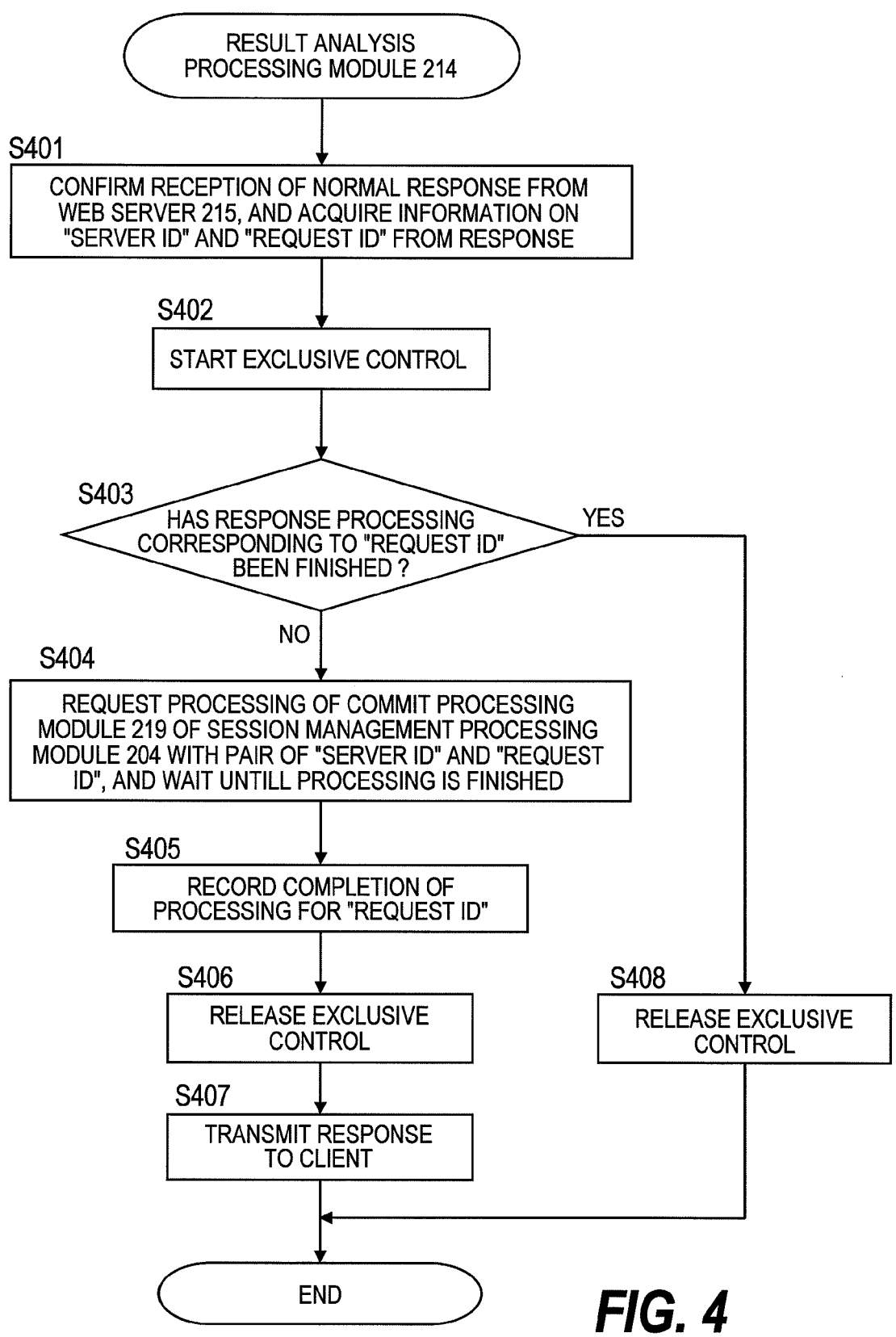
FIG. 4 is a flowchart illustrating a sequence of responding to a processing request received from a client computer according to the first embodiment of this invention.

FIG. 4 is a flowchart illustrating the sequence of responding to a processing request received from a client computer according to the first embodiment of this invention.

The CPU 321 of the intelligent proxy server 202 executes the result analysis processing module 214 included in the intelligent proxy processing module 211, and, when a reception of a normal response from the Web server 215 of the application server program 203 is confirmed, acquires a "server ID" and a "request ID" contained in the received response (S401).

The CPU 321 of the intelligent proxy server 202 activates exclusive control processing in order to prevent this processing from being executed when a response is received from another application server program 203 (S402).

Moreover, the CPU 321 of the intelligent proxy server 202 determines whether processing corresponding to the acquired request ID has been finished (S403). When the processing has been finished ("YES" in Step S403), the processing of returning a processing result corresponding to the request ID has been completed, and the CPU 321 releases the exclusive control processing activated by the processing in Step S402 (S408), and finishes this processing.

When the processing has not been completed ("NO" in Step S403), the CPU 321 of the intelligent proxy server 202 transmits a commit request for determining the selection of a session to the commit processing module 219 included in the session management processing module 204 of the session management server 340, and waits until the processing is completed (S404). The commit request contains the server ID and the request ID obtained in the processing in Step S401. A description will later be given of the processing carried out by the commit processing module 219. In this case, the response received in the processing in Step S401 is the first response to the request ID returned by the application server program 203.

When the processing corresponding to the request ID obtained in the processing in Step S401 has been completed, the CPU 321 of the intelligent proxy server 202 records the completion of the processing in the main memory 322 (S405). Moreover, the CPU 321 releases the exclusive control processing activated in Step S402 (S406). Finally, the CPU 321 transmits a response to the client computer 201 (S407), and finishes this processing.

A description will now be given of the sequence carried out by the session management processing module 204 for registering session information corresponding to a response determined to be transmitted to the client computer 201.

The CPU 341 of the session management server 340 receives a commit request transmitted by the result analysis processing module 214.

The CPU 341 of the session management server 340 causes the commit processing module 219 to search the buffer table 224 based on a server ID and a request ID contained in the received commit request, and obtains a corresponding record.

The CPU 341 of the session management server 340 registers a session ID and session contents contained in the received record to the session storage database 225.

Moreover, the CPU 341 of the session management server 340 searches the buffer table 224 for records having the request ID coincident with the received request ID, and deletes the searched records.

Finally, the CPU 341 of the session management server 340 notifies the result analysis processing module 214 of the intelligent proxy processing module 211 of the completion of the processing, and finishes this processing.

The above-mentioned sequence can prevent the inconsistency between information received by a requesting client computer 201 and contents of session information managed inside the system, thereby solving the problem of the session collision.

Further, as described above, this invention, as a solution for the inconsistency problem caused by update-type accesses, adds to the intelligent proxy processing module 211 or the application server program 203 processing of determining the degree of redundancy of duplicate requests according to "whether or not an update-type request is to occur". For example, on a timing when a possibility of the inconsistency problem caused by update-type accesses is generated, duplicate requests are pruned. A description will now be give of an overview of the processing.

Figure 5:
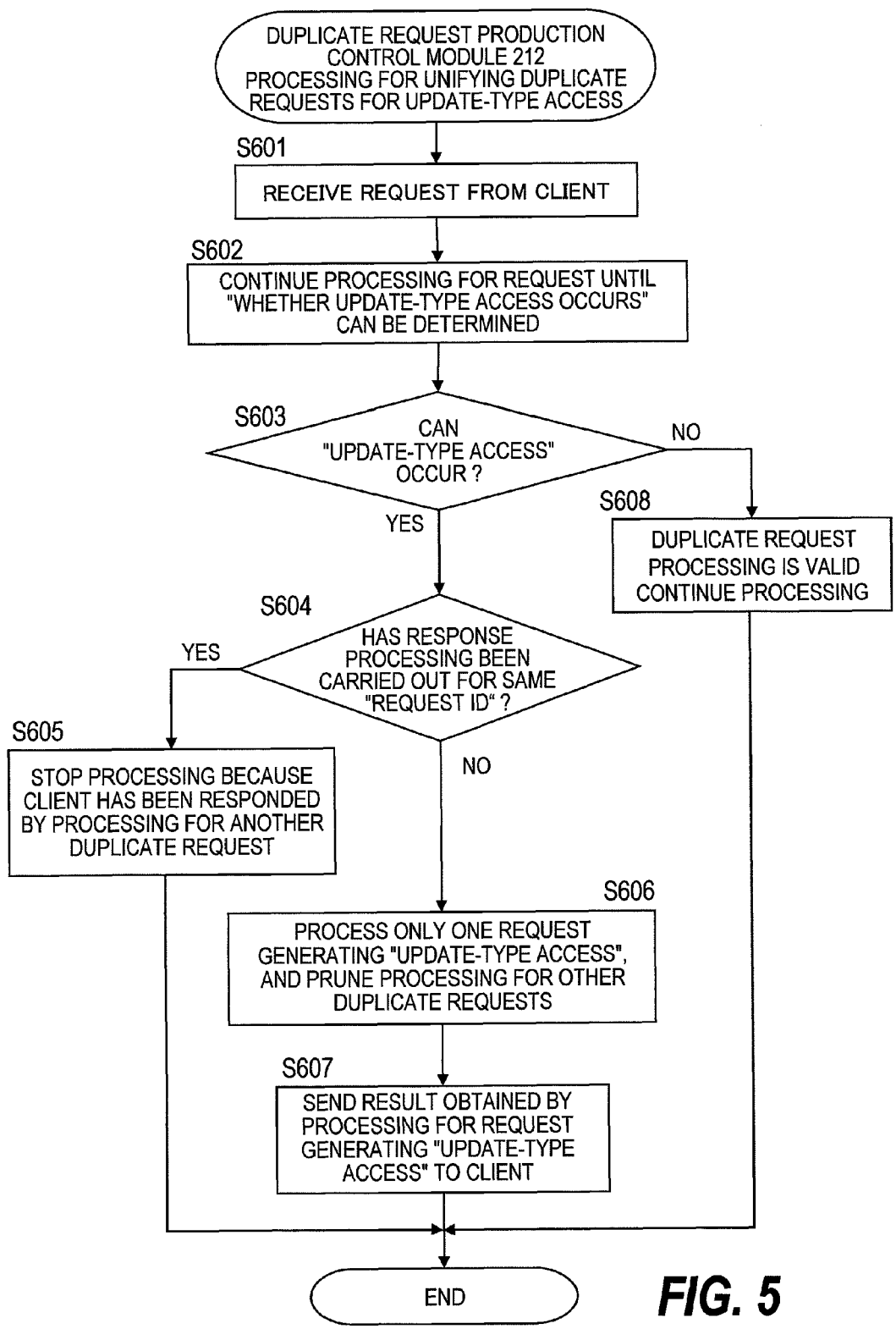
FIG. 5 is a flowchart illustrating a sequence of unifying a degree of redundancy of a request including an update-type access according to the first embodiment of this invention.

FIG. 5 is a flowchart illustrating a sequence of unifying the degree of redundancy of a request including an update-type access according to the first embodiment of this invention.

This processing prevents, by reducing the number of duplicate requests, which possibly generate an update-type access, to one, and transmitting only a response of a processed request to a client computer, the inconsistency problem caused by update-type accesses from occurring. As a result, for the respective duplicate requests, the processing employing "tentative execution", "real execution", and "execution cancellation" is not necessary.

When the CPU 321 of the intelligent proxy server 202 receives a request transmitted from the client computer 201 (S601), the CPU 321 continues processing up to a timing on which a determination "whether an update-type access possibly occurs" can be made (S602). Criteria for determining "whether an update-type access possibly occurs" include a fact that a predetermined module is executed, or that an access is actually made to the outside. It is not necessary to surely determine whether an update-type access occurs, and it is sufficient to determine whether an update-type access possibly occurs. Moreover, a request is processed by the application server program 203, but the request and a response are transmitted and received between the application server program 203 and the intelligent proxy server 202.

When an update-type access will not occur ("NO" in Step S603), the CPU 321 of the intelligent proxy server 202 continues the processing for the duplicate requests (S608).

On the other hand, when an update-type access will possibly occur ("YES" in Step S603), the CPU 321 of the intelligent proxy server 202 determines whether the response processing has ever been carried out for other requests having the same request ID (S604). When the response processing has been carried out for other requests having the same request ID ("YES" in Step S604), the CPU 321 of the intelligent proxy server 202 stops the processing for the duplicate requests to be processed (S605).

When the response processing has never been carried out for other requests having the same request ID ("NO" in Step S604), the CPU 321 of the intelligent proxy server 202 causes the processing for the other duplicate requests of the same request ID to be stopped (S606). Moreover, the CPU 321 of the intelligent proxy server 202 waits until the processing for the request to be processed is completed, and sends a processing result to the client computer 201 (S607).

When the degree of redundancy for a request is one, this embodiment is equivalent to a load balancer providing a function of detecting a server failure and a function of automatic retry. As a result, it is not possible to realize a response performance free from influence of a failure, which is realized when only reference-type accesses exist. However, in a Web application system to which this invention is mainly applied, most of requests transmitted by client computers are "reference-type accesses", and a sufficient response performance can be secured in an overall system.

Figure 6:
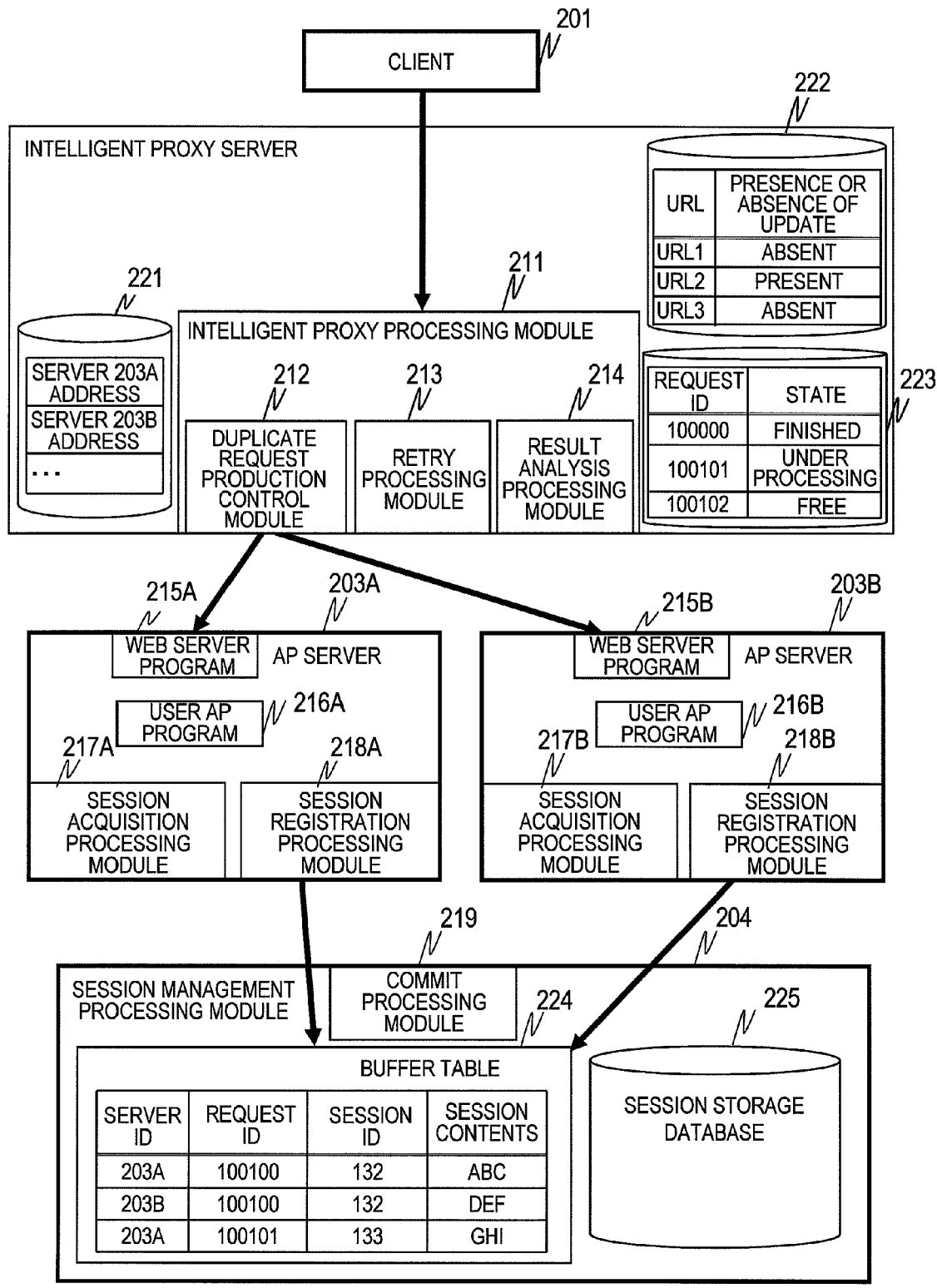
FIG. 6 is a block diagram illustrating a system configuration according to the first embodiment of this invention.

FIG. 6 is a block diagram illustrating a system configuration according to the first embodiment of this invention.

The first embodiment of this invention is applied to a case in which whether or not an update-type access to an external system will occur is determined according to a request URL.

The intelligent proxy server 202 includes the configuration described in FIG. 2 as well as a server address table 221, an update-type access presence/absence definition table 222, and a request ID state table 223.

The server address table 221 stores a list of addresses of the application server programs 203 for processing requests transmitted by the client computer 201. As an address of the application server program 203, a combination of an Internet protocol (IP) address and a port number is used, for example. FIG. 6 illustrates only server addresses, but the server address table 221 stores information such as an operation state of the application server program 203 including "operating" and "failed".

The intelligent proxy server 202 refers to the server address table 221 in order to select an application server program 203 to which a request is to be transmitted. Specifically, the intelligent proxy server 202 selects an application server program 203 according to the round robin. Moreover, the intelligent proxy server 202 includes means for recording failure information for a server address, means for preventing reference to an address of a failed application server program 203 if any failed server exists, and means for adding and deleting server addresses.

The update-type access presence/absence definition table 222 stores information indicating whether or not an update-type access to an external system occurs for URL's requested by the client computer 201.

The request ID state table 223 records a state of a request received from the client computer 201 for respective request ID's. The statuses of requests include three types of status, which are "free", "under processing", and "finished", for example. According to the first embodiment of this invention, a request ID is not produced each time when a request is received from the client computer 201, but unique request ID's are prepared in advance. When a request is received, a request ID, which is generated in advance, is assigned to the received request. The state "free" indicates that a request ID is not assigned to any request.

The intelligent proxy processing module 211 includes, in addition to the configuration illustrated in FIG. 2, a retry processing module 213. The retry processing module 213 retransmits, upon a failure of an application server program 203, a request to another application server program 203. A specific description will later be given thereof.

The application server programs 203A and 203B include the same user application programs 216A and 216B. When the intelligent proxy server 202 simultaneously transmits requests respectively to the application server programs 203A and 203B, the user application programs 216A and 216B independently process the requests. FIG. 6 illustrates only two application server programs 203, but an intended system of application includes ten to hundreds of application server programs 203.

The buffer table 224 and the session storage DB 225 are the same as those described with reference to FIG. 2.

Figure 7:
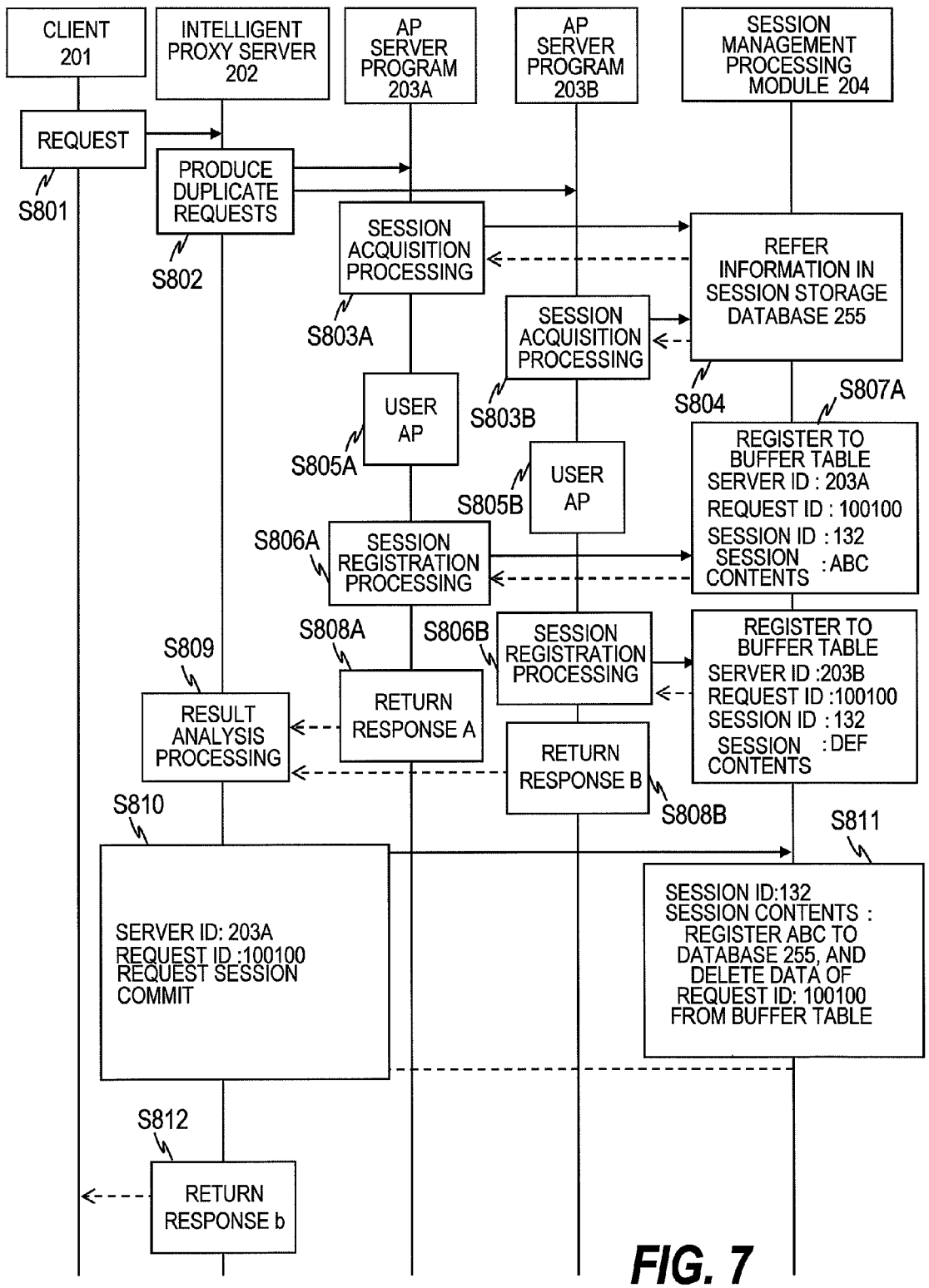
FIG. 7 is a sequence diagram illustrating a sequence of processing a request transmitted from the client computer according to the first embodiment of this invention.

FIG. 7 is a sequence diagram illustrating a sequence of processing a request transmitted from the client computer 201 according to the first embodiment of this invention.

The client computer 201 receives a request for task processing from a user, and transmits a request to the intelligent proxy server 202 (S801).

The duplicate request production control module 212 of the intelligent proxy server 202 transmits duplicate requests produced from the received request to the application server programs 203 (S802). Specifically, the duplicate request production control module 212 refers to the request ID state table 223, and obtains a "free" request ID. Moreover, the duplicate request production control module 212 changes the state of a record corresponding to the obtained request ID from "free" to "under processing".

Then, the duplicate request production control module 212 determines the degree of redundancy of the request by executing the processing illustrated in the flowchart of FIG. 5. In other words, when the request contains only reference-type accesses, the plurality of application server programs 203 process the duplicate requests. On the other hand, when the request possibly contains an update-type access, duplicate requests will not be produced, or produced duplicate requests are unified.

First, the duplicate request production control module 212 refers to the update-type access presence/absence definition table 222, thereby determining whether the request received from the client computer 201 possibly generates an update-type access (S603 of FIG. 5). Specifically, based on URL's corresponding to the request, the duplicate request production control module 212 searches the update-type access presence/absence definition table 222, thereby obtaining information on the presence/absence of update.

When an update-type access will possibly occur, the duplicate request production control module 212 sets the degree of redundancy to one for the request, and thus does not produce duplicate requests. When duplicate requests have already been produced, the duplicate request production control module 212 stops processing for the duplicate requests except for one request.

The duplicate request production control module 212 produces, for a request for which an update-type access will not occur, duplicate requests while the degree of redundancy is set to equal to or more than two. The degree of redundancy may be a fixed value, or may be dynamically changed. A description will later be given of a method of dynamically changing the degree of redundancy in a fifth embodiment of this invention.

The duplicate request production control module 212 determines the degree of redundancy, and then, refers to the server address table 221 to obtain addresses of application server programs 203 to which the duplicate requests are to be transmitted. The application server programs 203 are selected according to the round robin as described before, for example. Other methods for selecting application server programs 203 will be described in third and fourth embodiments.

The duplicate request production control module 212 transmits the duplicate requests produced from the request received from the client computer 201 to the selected application server programs 203 in parallel. According to the first embodiment, the requests are transmitted to both the application server programs 203A and 203B. Moreover, to the requests to be transmitted, the request ID's are assigned.

The application server program 203A causes the Web server 215A to receive the contents and the request ID of the request. Moreover, the application server program 203A causes the user application 216A to process the request. The application server program 203B carries out the same processing (S803B to S808B).

On this occasion, the user application 216A causes the session acquisition processing module 217A to acquire session information from the session storage DB 225 of the session management processing module 204 (S803A and S804).

Moreover, when the user application 216A has processed the request (S805A), the user application 216A causes the session registration processing module 218A to register session information to the session management processing module 204. Specifically, the user application 216A requests the session management processing module 204 to carry out processing of registering a server ID 2241, a request ID 2242, a session ID 2243, and session contents 2244 to the buffer table 224 (S806A and S807A). On this occasion, the server ID is a string uniquely identifying the application server program 203 which has processed the request, and is a string produced based on the server address, and a process ID and a thread ID of the application server program 203, for example. A combination of a server ID and a request ID is unique even when duplicate requests are produced, and hence the registration to the buffer table 224 will never cause a collision of sessions.

When the user application 216A has finished the processing of the request, the user application 216A transmits a response via the Web server 215A to the result analysis processing module 214 (S808A).

When the result analysis processing module 214 receives the response from the application server program 203, the result analysis processing module 214 analyzes contents of the response, and, based on a result of the analysis, determines a response to be returned to the client computer 201 (S809). Moreover, when the result analysis processing module 214 receives the response from the application server program 203, the result analysis processing module 214 further receives the server ID of the application server program 203 which has processed the request.

Specifically, the result analysis processing module 214 first analyzes the contents of the response, and determines whether the processing is finished normally (normal end) or abnormally (abnormal end). The abnormal end in this case is caused by a system failure or a processing time out, and is not a display of an error screen as a result of a normal processing of the request carried out by the system (such as an error screen indicating an error when a requested file has not been found). The result analysis processing module 214 is executed when a response is received from the each application server program 203, and a plurality of processes are executed in parallel inside the intelligent proxy server 202.

When the result analysis processing module 214 detects an abnormal end, the result analysis processing module 214 first copies failure information to the server address table 221. Then, the result analysis processing module 214 refers to the request ID state table 223, and determines whether the abnormally finished request corresponding to the request ID is in the state of "under processing". When the state is "under processing", the result analysis processing module 214 requests the retry processing module 213 for retry processing. When the state is "finished", a response has already been returned, and hence the result analysis processing module 214 directly finishes the processing. Subsequently, the result analysis processing module 214 sets the failed application server program 203 in an unselectable state until the failed application server program 203 recovers.

The retry processing module 213 obtains an address of an application server program 203 which will process the request next time from the server address table 221, and transmits a request to which the request ID is assigned to the obtained server address. As a result, during the processing of the request, a certain degree of redundancy is always maintained, and thus, the processing of the duplicate requests continues on a predetermined number of the application server programs 203. Therefore, even when a plurality of application server programs 203 fail at the same time, it is possible to provide stable reliability and continuity. When all the application server programs 203 fail, the retry processing module 213 gives up the continuation of the processing, records the state of "finished" to the record corresponding to the request ID of the request to be processed in the request ID state table 223, and notifies the client computer 201 of the error.

When the result analysis processing module 214 detects a normal end, the result analysis processing module 214 applies the exclusive control processing to the processing for the same request ID. When the exclusive control processing is successful, the result analysis processing for the requests having the same request ID operating in parallel is suspended until the exclusive control processing is released. The exclusive control processing is carried out only in the result analysis processing module 214, and the processing continues in other processing modules (such as the application server program 203B) in parallel.

The result analysis processing module 214 refers to the request ID state table 223, and determines whether the request to be processed is in the state of "under processing". When the request to be processed is in the state of "finished", a response for the request corresponding to the subject request ID has already been transmitted to the client computer 201, and hence it is not necessary to continue the processing. Thus, the result analysis processing module 214 releases the exclusive control processing, and finishes the processing.

On the other hand, when the state of the request corresponding to the request ID is "under processing", the result analysis processing module 214 transmits information on the "server ID" of the application server program 203A which has transmitted the response and the "request ID" as a message to the commit processing module 219 of the session management processing module 204 (S810).

When the commit processing module 219 receives the message, the commit processing module 219 refers to the buffer table 224, thereby obtaining all records having the request ID corresponding to the received "request ID". The commit processing module 219 registers, of the obtained records, a record having the server ID coincident with the "server ID" of the application server program 203A to the session storage database 225 (S811). Then, the commit processing module 219 deletes all the records having the request ID coincident with the received "request ID" in the buffer table 224. When the commit processing module 219 has finished the above-mentioned processing, the commit processing module 219 transmits a notice of completion to the result analysis processing module 214.

When the result analysis processing module 214 receives the notice of completion from the commit processing module 219, the result analysis processing module 214 changes the state of the record in the request ID state table 223 corresponding to the request ID of the processed request to "finished". Then, the result analysis processing module 214 releases the exclusive control processing, and transmits the response received from the application server program 203A to the client computer 201 (S812).

The above-mentioned sequence can solve the problem of session collision.

When only user application programs 216, which do not refer to the session information, run on the application server programs 203, the processing of making a series of inquiries to the session management processing module 204 is not necessary.

According to the first embodiment of this invention, in the processing carried out by the result analysis processing module 214, the earliest response is finally selected of responses processed in parallel by the plurality of application server programs 203. In this case, as the degree of redundancy increases, the response performance approaches an optimum response performance obtained when "a request is transmitted to an application server which appears to have least load, and thus to provide an excellent response performance", which is carried out by a conventional load balancer.

Therefore, according to the first embodiment of this invention, as the method for selecting servers which process duplicate requests, a simple method such as the "round robin" can provide a processing performance close to that provided by the load balancer which selects a server having the lowest load.

According to the first embodiment of this invention, a load is concentrated on the session management processing module 204, and hence there may be provided a configuration which increases the redundancy of the session management processing module 204.

According to the first embodiment of this invention, the session management processing module 204 carries out processing equally for all the application server programs 203, and the intelligent proxy processing module 211 includes the retry processing module 213. Hence, all combinations of the application server programs 203 may be used for processing a request. Thus, unless all the application server programs 203 fail, the request processing can continue.

According to the first embodiment of this invention, by producing duplicate requests from a received request, it is possible to increase the reliability, availability, and processing performance, thereby building a robust application server system.

Further, according to the first embodiment of this invention, by utilizing servers which exist as surplus resources, and are low in operation rate, it is possible to cause those servers to contribute to an increase in reliability of the system, for example.

Moreover, according to the first embodiment of this invention, it is possible to reduce the dependency between a request transmitted from a client computer and application servers which process the request, and, even when a Web application operating on the application servers requires session information, the session collision problem can be avoided.

Moreover, according to the first embodiment of this invention, when, in the application server system carrying out processing in cooperation with the external system, duplicate requests are produced, it is possible to avoid the inconsistency problem such as a double update due to update-type accesses.

Further, according to the first embodiment of this invention, in the system such as the Web server, in which reference-type accesses frequently occur, compared with a system in which the consistency is secured by carrying out transaction management, it is possible to increase the performance.

Second Embodiment

A second embodiment of this invention is applied to a case in which presence/absence of the update-type access request to an external system 904 cannot be determined based on a request URL of the client computer 201. When, as in the first embodiment, the presence/absence of the update-type access request can be determined based on a request URL, the system can be designed for an intended purpose known in advance, but this is not a case of a usual application server system, and is thus handled in the scope of the second embodiment. A description of parts and components common to the first embodiment is properly omitted.

Figure 8:
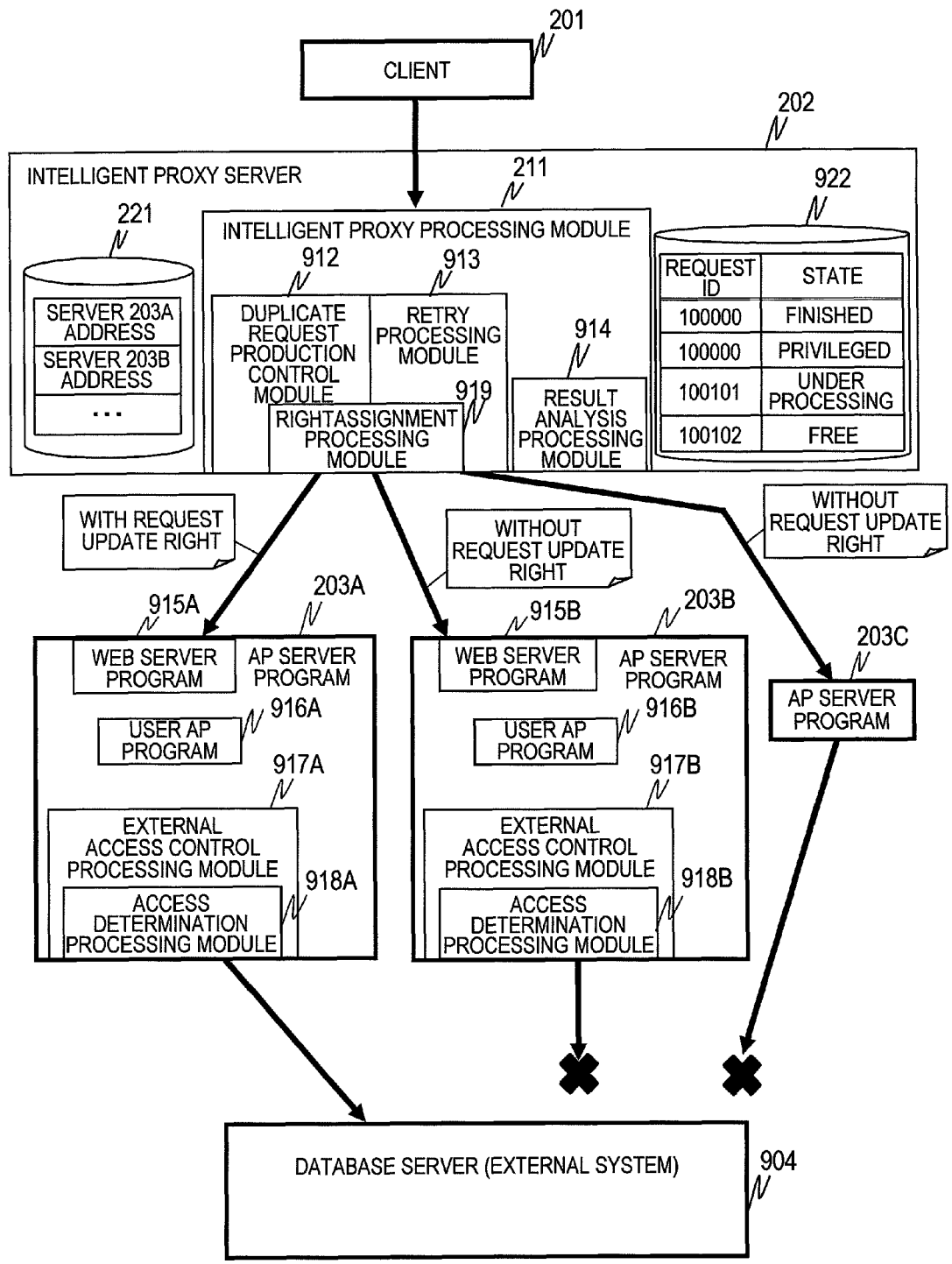
FIG. 8 is a block diagram illustrating a system configuration according to a second embodiment of this invention.

FIG. 8 is a block diagram illustrating a system configuration according to the second embodiment of this invention.

The sequence of the session control is the same as that of the first embodiment, and hence description thereof is omitted. Moreover, in FIG. 8, the configuration for controlling the session is partially omitted.

The intelligent proxy server 202 includes a request ID state table with right control 922. The request ID state table with right control 922 is an extended version of the request ID state table 223 according to the first embodiment. Specifically, the current state of the request processing corresponding to a request ID is represented by four types of statuses, which are "free", "under processing", "finished", and "privileged". Moreover, it is possible to activate the exclusive control processing for an access to the request ID state table with right control 922 for each request ID. The exclusive control processing in a result analysis processing module 914 is also implemented by this function.

Moreover, the intelligent proxy processing module 211 includes a right assignment processing module 919. The right assignment processing module 919 is executed by a duplicate request production control module 912 and a retry processing module 913.

The duplicate request production control module 912, which is different from the duplicate request production control module 212 according to the first embodiment, always produces two or more duplicate requests independently of contents of a request URL, and transmits the duplicate requests to a plurality of application server programs 203 at the same time. On this occasion, the duplicate request production control module 912 selects one of the produced duplicate requests, and the right assignment processing module 919 assigns an update right to the selected request.

A method for selecting a request to which the update right is assigned can be any method, and the request may be selected at random, or a request transmitted to an application server program 203 with a low load may be selected. A description will be given of the method for selecting a request to which the update right is assigned in the fourth embodiment.

When a Web server 915 receives the duplicate request produced by the duplicate request production control module 912, the Web server 915 determines whether the update right is assigned to the received request. Information on the assignment of the update right can be added by extending the request header of the hyper text transfer protocol (HTTP), for example.

Moreover, according to the second embodiment of this invention, the application server program 203 includes an external access control processing module 917. An access to the external system made by the application server program 203 is always carried out through the external access control processing module 917.

The external access control processing module 917 includes an access determination processing module 918 for determining whether an access to the external system 904 is the update type or the reference type. The access determination processing module 918 discriminates contents of a request intended to the external system 904 received from a user application 916 into a "reference-type access", an "update-type access", or an "indistinguishable" access. A protocol used for the communication between the user application 916 and the external system 904 (such as SQL used for access to a relational database) varies depending on a system to be built. Thus, the access determination processing module 918 may be implemented differently according to an applied system. For example, the access determination processing module 918 may be in a form of a definition file which can be defined as a text by a user, a form of a module integrated into the application server program 203, or a form originally implemented by a user who builds a system, and integrated into the external access control processing module 917.

When an access of the user application 916 to the external system 904 is determined as a "reference-type access" by the access determination processing module 918, this access will not cause the inconsistency problem, which is caused by update-type accesses. Thus, in this case, the external access control processing module unit 917 carries out control for permitting the access to the external system 904.

On the other hand, when the access of the user application 916 to the external system 904 is determined as an "update-type access" or an "indistinguishable" access by the access determination processing unit 918, the external access control processing unit 917 determines whether the update right is assigned to the request under processing.

When the update right is not assigned to the request under processing, the external access control processing unit 917 considers the request under processing as a request subject to pruning, and stops the request processing. On this occasion, the Web server 915 notifies the result analysis processing unit 914 of a response indicating that the pruning has been carried out. When the result analysis processing unit 914 receives this response, the result analysis processing unit 914 does not carry out the retry processing, and finishes the processing.

When the update right is assigned to the request under processing, the external access control processing 917 makes an access to the request ID state table with right control 922, activates the exclusive control processing for a request ID, and determines whether the state corresponding to the request ID is "under processing". When the state corresponding to the request ID is "finished", a response to the client computer 201 corresponding to this request ID has been finished by another application server program 203. Thus, the external access control processing module 917 releases the exclusive control processing, and finishes the request processing without access to the external system 904.

On the other hand, when the state corresponding to the request ID is "under processing", the external access control processing module 917 updates the state corresponding to the request ID to "privileged" in the request ID state table with right control 922, and releases the exclusive control processing. Then, when the external access control processing module 917 has finished the update to the state "privileged", the external access control processing module 917 subsequently carries out the update-type access. The update to the state "privileged" is carried out only once for the request ID, and when the external access control processing module 917 subsequently receives an access request to the external system 904, the external access control processing module 917 does not determine the type of the access, and provides control for permitting the access to the external system 904.

When the state corresponding to the request ID is updated to "privileged" in the request ID state table with right control 922, the request corresponding to this request ID become privileged. On this occasion, the request to which the update right is assigned is processed by priority, and a result of the processing of this request is transmitted as a response to the client computer 201. The above-mentioned sequence is illustrated in FIG. 9.

Figure 9:
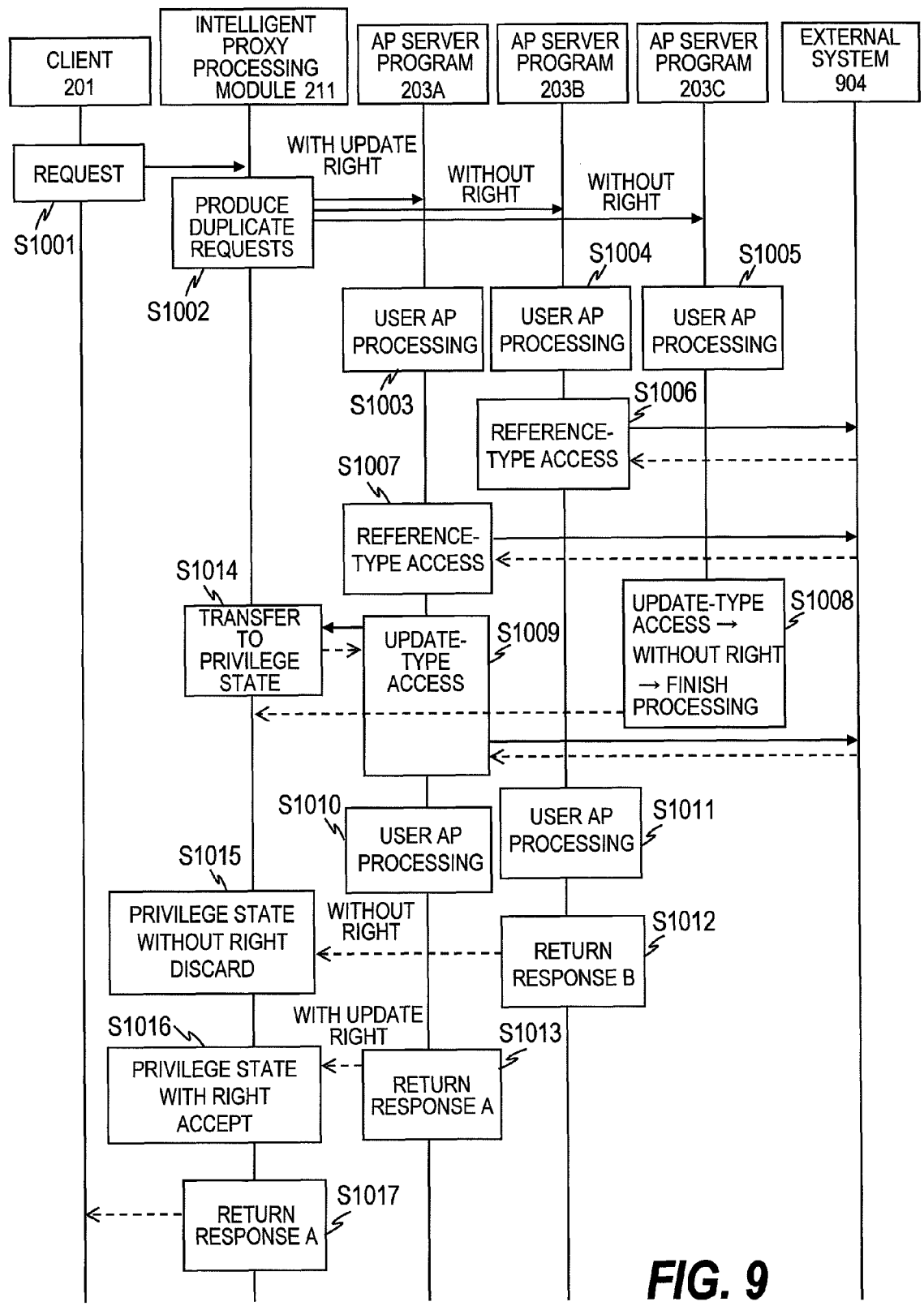
FIG. 9 is a sequence diagram illustrating sequence of processing a request received from the client computer and controlling an access to an external system according to the second embodiment of this invention.

FIG. 9 is a sequence diagram illustrating the sequence of processing a request received from the client computer 201, and controlling an access to the external system 904 according to the second embodiment of this invention.

The client computer 201, as in the first embodiment, transmits a request to the intelligent proxy processing module 211 (S1001).

The duplicate request production control module 912 of the intelligent proxy processing module 211 produces duplicate requests, and transmits the duplicate requests to the respective application server programs 203 (S1002). On this occasion, the duplicate request production control module 912 assigns the update right to one of the duplicate requests. Then, the respective application server programs 203 process the received requests (S1003 to S1013). On this occasion, the external access control processing module 917 of the application server program 203 controls the access to the external system 904 based on the presence/absence of the update right assigned to the request as described above (S1006 to S1009 and S1014).

The result analysis processing module 914 of the intelligent proxy processing module 211 receives a response from the application server program 203 (S1015, S1016). When the received response is a response to the request to which the update right is assigned, it is recognized that the update right is assigned to the response. For example, the Web server 915 may add the information by extending the response header of the HTTP, or may employ another method. The result analysis processing module 914, as in the first embodiment, after activation of the exclusive control processing, accesses the request ID state table with right control 922, and checks the state corresponding to the request ID.

When the state of the record corresponding to the request ID is "under processing" or "finished", the result analysis processing module 914 carries out processing as in the first embodiment.

On the other hand, when the state of the record corresponding to the request ID is "privileged", the record illustrates that an update-type access has been made to the external system 904. In this case, if the result of the processing for the request without right are returned to the client computer 201, an inconsistency occurs in the system. Thus, the result analysis processing module 914 first determines whether the response received from the application server program 203 has the update right. When the response does not have the update right, the result analysis processing module 914 releases the active exclusive control processing, and finishes the processing (S1015). When the response has the update right, the result analysis processing module 914 carries out processing similar to that subsequent to the session registration processing according to the first embodiment (S1009, S1010, S1013, S1016, and S1017).

When the processing for the request to which the update right is assigned is being privileged, processing for requests to which the update right is not assigned is terminated, and pruned on the timing when "an update-type access is requested to the external access control processing module 917" (S1008) or on the timing when "the request processing has been finished, and a response is returned to the result analysis processing module 914" (S1015).

A description will now be given of a processing sequence carried out by the result analysis processing module 914 when a failure occurs.

First, the result analysis processing module 914 accesses the request ID state table with right control 922, and determines the state corresponding to respective ID's.

When the state corresponding to a request ID is "under processing", the result analysis processing module 914 requests the retry processing module 913 for processing. When the update right is assigned to the request which has encountered the failure, the update right is also assigned to the request for the retry. Similarly, when the update right is not assigned to the request which has encountered the failure, the update right is not assigned to the request for the retry. Subsequently, until the failure occurring in the application server program 203 is recovered, access to the request ID state table with right control 922 is denied for a combination of the "server ID" corresponding to the failed application server program 203 and a "request ID".

Moreover, the state corresponding to the request ID is "finished", it is not necessary to carry out the retry processing. The processing is finished as in the first embodiment.

Further, when the state corresponding to the request ID is "privileged", it is determined whether the update right is assigned to the request which has encountered the failure. When the update right has not been assigned, the update right is being activated, and the retry processing is not necessary, and the processing is directly finished. When the update right has been assigned, it is considered that the application server program 203 has failed during the update processing, and the request processing has not been completed. In this case, first, the result analysis processing module 914 notifies the external system 904 of the failed transaction processing from the object server, and carries out rollback processing on the external system 904. After the rollback processing has been successfully completed, the result analysis processing module 914 accesses the request ID state table with right control 922, and resets the state corresponding to the request ID from "privileged" to "under processing". Moreover, the result analysis processing module 914 requests the retry processing module 913 for retry. When the retry processing module 913 transmits the request to be retried, the retry processing module 913 assigns the update right to this request. Subsequently, until the failure occurring in the application server program 203 is recovered, access to the request ID state table with right control 922 is denied for a combination of the server ID corresponding to the failed server and a "request ID".

With the above-mentioned sequence, it is possible to avoid the problem of inconsistency as a result up update-type access to the external system.

According to the second embodiment of this invention, the timing for activating the update right as the timing for pruning duplicate requests is delayed as late as the privileged processing becomes actually necessary. As described above, in a Web application system, most of access to the external system are reference-type accesses. Thus, even for requests directed to the same URL, most of the requests are highly possibly finished by processing only reference-type access before processing update-type accesses. In the second embodiment, the response performance in a case in which the proportion of reference-type access is large can be increased.

Moreover, according to the characteristic of the second embodiment, such a restriction as "whether or not a request being processed generates update-type access can be determined according to an URL" is not imposed on the design of the user application program, which is the prerequisite of the first embodiment, and hence the second embodiment is thus excellent for migration from a conventional system.

Third Embodiment

The third embodiment of this invention provides a configuration in which a plurality of virtual computers are running on a plurality of physical computers, thereby increasing redundancy of application servers. Since the number of physical computers required for increasing the redundancy can be reduced, a more practical system configuration is provided in terms of installation space and power consumption compared with a case in which all computers are physically provided.

In the first and second embodiments, the round robin is used as the method of selecting an application server, and, in the third embodiment, a description will be given of the method of selecting an application server, which employs the round robin extended to the system configuration including a plurality of virtual computers.

Figure 10:
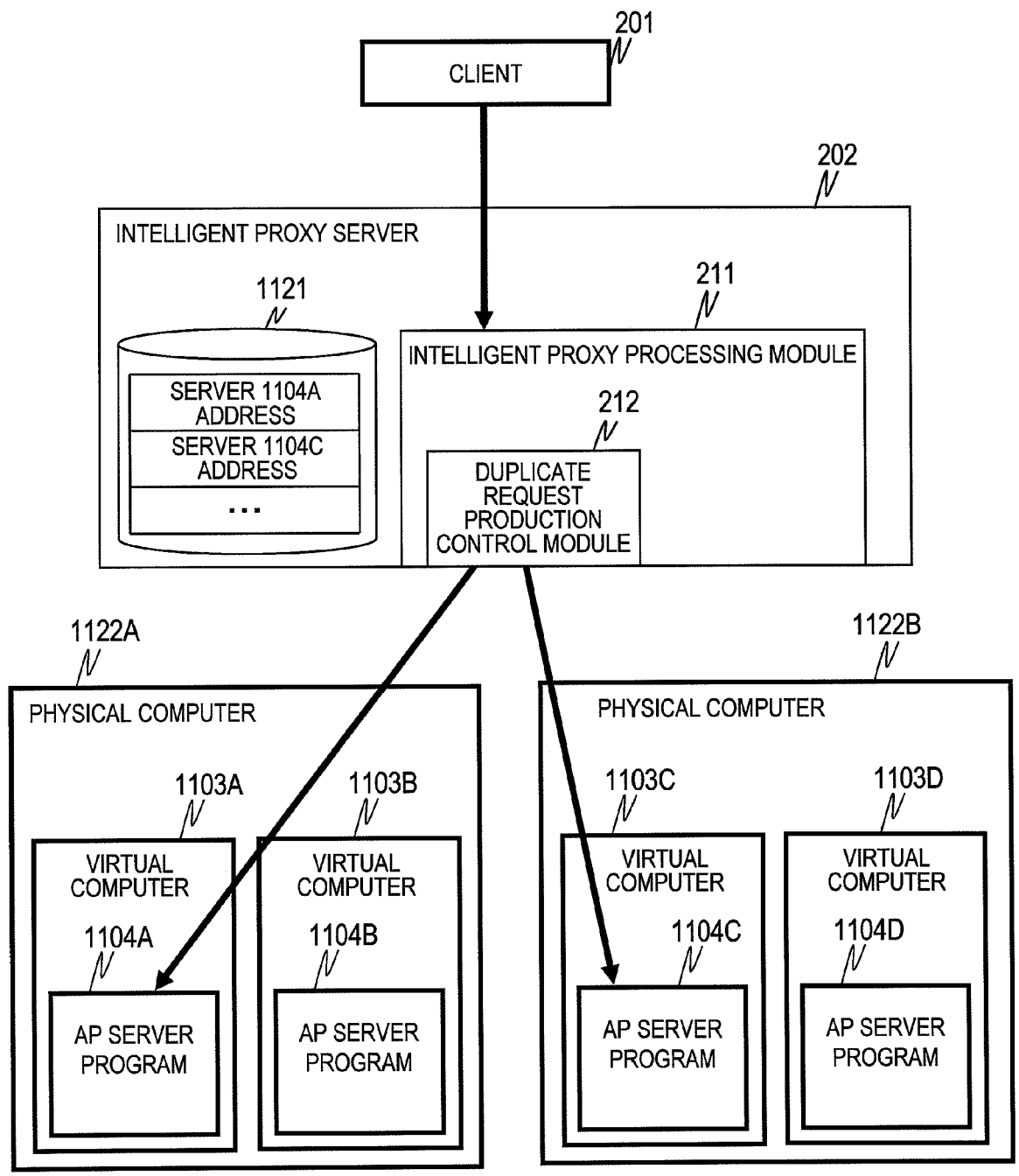
FIG. 10 is a diagram describing a system configuration according to a third embodiment of this invention.

FIG. 10 is a diagram describing a system configuration according to the third embodiment of this invention.

In the virtual computer technology, virtual computers capable of operating in parallel on a single physical computer are built, thereby enabling simultaneous execution of a plurality of OS'es and the like thereupon.

In an example illustrated in FIG. 10, there is provided a configuration in which two virtual computers 1103A and 1103B, 1103C and 1103D are produced on the same physical computer 1122A and 1122B respectively, and one application server program 1104A, B, C, D is caused to operate on each of the virtual computers 1103A, B, C, D.

The virtual computers built on the same physical computer can operate independently of each other, and share a part of resources such as a network interface card (NIC) on the physical computer.

Thus, for example, when a physical failure such as a failure of the NIC occurs on the physical computer on which the plurality of virtual computers are running, there is a demerit that the failure influences all the virtual computers running on the same physical computer.

Moreover, the virtual computers share the resources, and thus, when a load is concentrated on a certain virtual computer running on the same physical computer, the performance of the other computers may decrease.

As a result, concentration of the processing on a single physical computer may pose problems such as a decrease in processing performance and an increase of influence in case of a failure. Therefore, in the third embodiment, in order to uniformly distribute processing, the following algorithm is introduced for selecting a server for processing a duplicate request. The following algorithm is referred to as round robin for uniform distribution to physical computers.

In the round robin for uniform distribution to physical computers, first, a uniform-distribution-to-physical-computer table 1121 is produced. The uniform-distribution-to-physical-computer table 1121 is produced by the following steps. It should be noted that the uniform-distribution-to-physical-computer table 1121 is stored in the intelligent proxy server 202 as illustrated in FIG. 10.

First, the number of virtual computers (N1, N2, . . . , Nn) running on respective physical computers 1, 2, . . . , n is obtained. Then, the least common multiple of N1, N2, . . . , Nn is obtained. On the respective physical computers, work tables T1, T2, . . . , Tn of a record number M are produced, and, as records of the work tables T1, T2, . . . , Tn, server addresses of application servers running on the virtual computers on the physical computers are sorted according to the round robin. Then, as the uniform-distribution-to-physical-computer table 1121, a table S of a record number M×n is produced, and the server addresses stored in the tables T1, T2, . . . , Tn are registered to the table S in such a way that S[i+(j−1)×n]=Ti[j], specifically, S[1]=T1[1], S[2]=T2[1], . . . , S[n]=Tn[1], S[1+n]=T1[2], S[2+n]=T2[2] . . . After the table S is produced, the work tables T1, T2, . . . , Tn may be deleted.

FIG. 11 illustrates an example of a sequence for producing the uniform-distribution-to-physical-computer table 1121 as described above.

FIG. 11 illustrates the example of producing the uniform-distribution-to-physical-computer table 1121 according to the third embodiment of this invention.

The example illustrated in FIG. 11 includes three physical computers (n=3). On the respective physical computers, three, two, and two virtual computers are running (N1=3, N2=2, and N3=2). Thus, the least common multiple M of N1, N2, and M3 is six. For the respective physical computers, work tables T1, T2, and T3 having M (=6) of records are produced as illustrated in FIG. 11. On the work tables T1, T2, and T3, A→B→C, D→E, and F→G are repeated twice, three times, and three times, respectively. Finally, in a sequence: T1[1](=A), T2[1](=D), T3[1](=F), T1[2](=B), . . . , those values are stored in the table S, namely the uniform-distribution-to-physical-computer table 1121 having the records of M×n(=18).

In the third embodiment, by referring to the produced uniform-distribution-to-physical-computer table 1121, an application server for processing a duplicate request is selected according to the round robin.

As the method of selecting an application server, when the round robin for uniform distribution to physical computers is applied, and when the number of physical computers is larger than the degree of redundancy, duplicate requests are always transmitted to application servers running on virtual computers provided on different physical computers. When the number of physical computers is less than the degree of redundancy, the same request is always processed on different physical computers, and the amount of duplicate requests to be sorted are uniformly distributed to the physical computers. In any of those cases, unless all the physical computers fail, the request processing can be always continued.

As described above, according to the third embodiment of this invention, by applying the round robin for uniform distribution to physical computers, it is possible to optimize the load distribution and reliability of the system.

It should be noted that, in order to promote maintenance and a degraded operation of the application servers, a tool for automatically carrying out the processing illustrated in FIG. 11 is preferably provided in advance. By automatically reproducing the uniform-distribution-to-physical-computer table 1121 according to a change in the configuration of a system, without stopping the entire system, it is possible to enable operations such as reboot of a part of the virtual computers and physical computers, and a replacement of machines, thereby promoting the operations.

When the physical computer, the virtual computer, or the application server fails, the uniform-distribution-to-physical-computer table 1121 is preferably reconfigured excluding the failed physical computer, virtual computer, or application server.

Moreover, when it is not necessary to strictly uniformly distribute the amount of processing, it is not necessary to distribute the load uniformly by employing the uniform-distribution-to-physical-computer table 1121 as illustrated in FIG. 11, and a plurality of virtual computers on a physical computer having high processing performance may carry out the processing.

In the third embodiment, the case in which one application server is running on one virtual computer is described. For a configuration of realizing redundancy in which a plurality of application servers are running on one virtual computer, the method of producing the uniform-distribution-to-physical-computer table 1121 described above may be extended so that the processing are distributed among the physical computers, and also among the virtual computers.

Fourth Embodiment

According to the fourth embodiment of this invention, weighting is added to the resource distribution available for respective virtual computers according to the third embodiment. According to recent technologies of virtual computer and central processing module, it is possible to control the resource distribution available for respective virtual computers.

The fourth embodiment is suitable for clearly separating produced duplicate requests into those for a "primary" and those for a "secondary". The amount of resources available for processing duplicate requests for the "primary" is larger than that of the third embodiment, thereby increasing the response performance of the system compared with the third embodiment. Conversely, when a virtual computer or a physical computer which processes duplicate requests for the "primary" fails, the response performance decreases. Thus, it is preferable to determine, based on, for example, the failure rate of the virtual computers or the physical computers, whether the third embodiment or the fourth embodiment is applied to a system.

Figure 12:
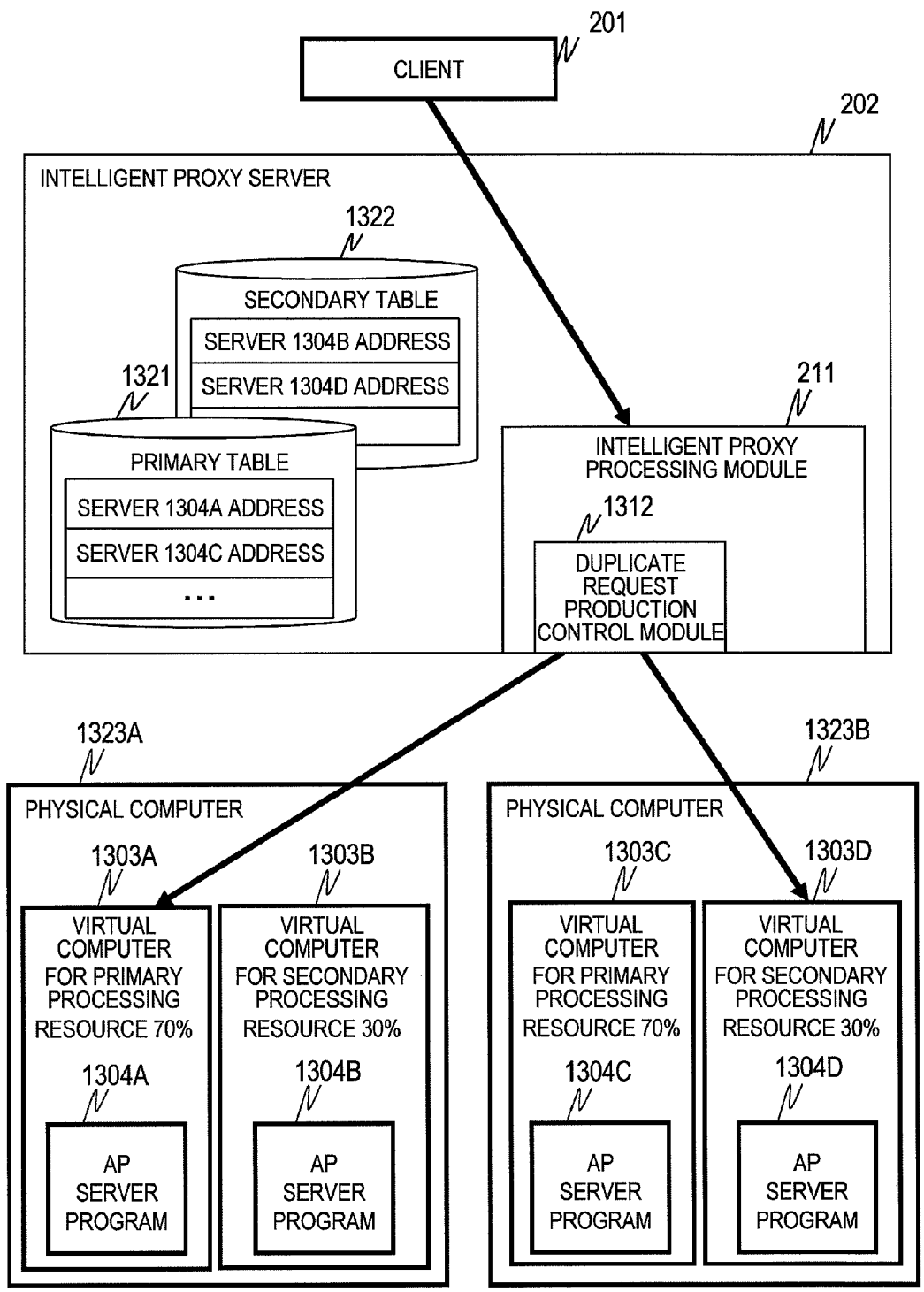
FIG. 12 is an explanatory diagram illustrating a system configuration according to a fourth embodiment of this invention.

FIG. 12 is a diagram describing a system configuration according to the fourth embodiment of this invention.

In the fourth embodiment, respective virtual computers running on respective physical computers 1323A, 1323B are separated into those "for primary processing" and those "for secondary processing". To the virtual computers "for primary processing", compared with the virtual computers "for secondary processing", more resources are assigned. In the example illustrated in FIG. 12, virtual computers 1303A and 1303C are assigned to the primary processing, and virtual computers 1303B and 1303D are assigned to the secondary processing.

application servers running on the virtual computers for primary processing are application servers for primary processing, and application servers running on the virtual computers for secondary processing are application servers for secondary processing. In the example illustrated in FIG. 12, application server programs 1304A and 1304C are assigned to the primary processing, and application server programs 1304B and 1304D are assigned to the secondary processing.

In the fourth embodiment, as illustrated in FIG. 12, a primary table for application servers for primary processing 1321 and a secondary table for application servers for secondary processing 1322 are respectively provided. The primary table 1321 and the secondary table 1322 are produced as in the third embodiment for avoiding processing for the same duplicate requests concentrated on the same physical computer, and thus distributing the processing.

When a duplicate request production control module 1312 produces duplicate requests, the duplicate request production control module 1312 considers one of the duplicate requests as a "primary" request, and the rest of the requests as "secondary" requests. The duplicate request production control module 1312 selects the address of an application server 1304 for processing the "primary" request from the primary table 1321 according to the round robin. The duplicate request production control module 1312 selects the addresses of application servers 1304 for processing the "secondary" requests from the secondary table 1322 according to the round robin.

On this occasion, the application servers 1304 are selected from the two tables 1321 and 1322 according to the round robin, and hence the same duplicate requests may not be strictly uniformly distributed to the physical computers. For the uniform distribution in the strict sense, as the method of selecting an application server for processing a "secondary" request, a secondary table excluding the physical computer used for the "primary" may be produced for the respective physical computers, and the secondary tables excluding the physical computer used for the "primary" may be referenced for selecting an application servers 1304 for the "secondary".

Moreover, as in the first embodiment, when presence/absence of update-type access to an external system can be determined according to a request URL, a request including update-type access may be processed only as a single "main-system" request.

Further, as in the second embodiment, when presence/absence of update-type access to the external system cannot be determined according to a request URL, it is preferable to always assign the update right to a "main-system" request.

According to the fourth embodiment of this invention, when the system load is low, the response performance is better than a conventional load balancer. Moreover, the algorithm for selecting application servers is simple, and hence it is possible to reduce the load imposed on the server selection processing on the load balancer.

Further, according to the fourth embodiment of this invention, a response result is mostly to be received from an application server which has processed a "main-system" request. Therefore, certain request processing may include processing for canceling, when response processing from one application server of the "primary" has been finished, the same request processing being carried out in application servers of the "secondary". Specifically, this method may simply restart all virtual computers carrying out the processing for the secondary, or may stop processes for processing the request.

Fifth Embodiment

In the fifth embodiment of this invention, processing for dynamically determining the degree of redundancy of a request is added to the third embodiment or the fourth embodiment.

A permissible amount of resources available for processing a request directly relates to the response performance. When the degree of redundancy of a request is increased, and the available amount of resources is increased, the possibility that the request is processed by an application server providing a high processing performance increases, resulting in an increase in response performance for a client computer. On the other hand, when the degree of redundancy is increased, the amount of resources available for processing another request is limited, and the response performance for this other request decreases. Therefore, it is not always desirable to simply increase the degree of redundancy for all requests.

To address this problem, the fifth embodiment includes, in the duplicate request production control module 1412, a redundancy degree determination processing module 1413 for dynamically controlling the degree of redundancy.

Figure 13:
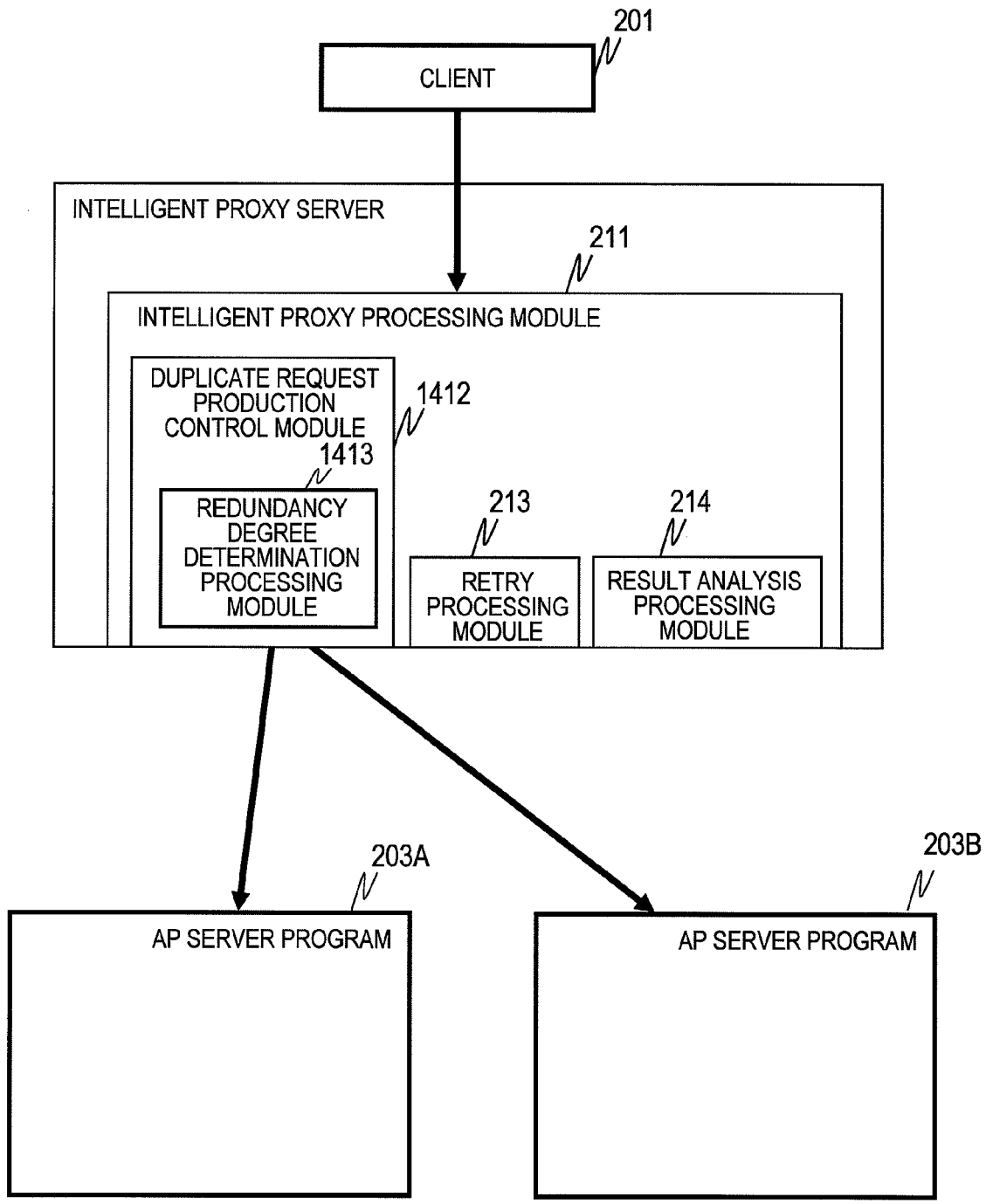
FIG. 13 is an explanatory diagram illustrating a system configuration according to a fifth embodiment of this invention.

FIG. 13 is a diagram describing a system configuration according to the fifth embodiment of this invention.

The fifth embodiment includes, as described above, in the duplicate request production control module 1412, the redundancy degree determination module 1413 for dynamically controlling the degree of redundancy. The redundancy degree determination processing module 1413 determines the degree of redundancy of a request based on the amount of resources of computers on which application servers running and the like. A description will now be given of three examples in which the redundancy degree determination processing module 1413 determines the degree of redundancy.

Figure 14:
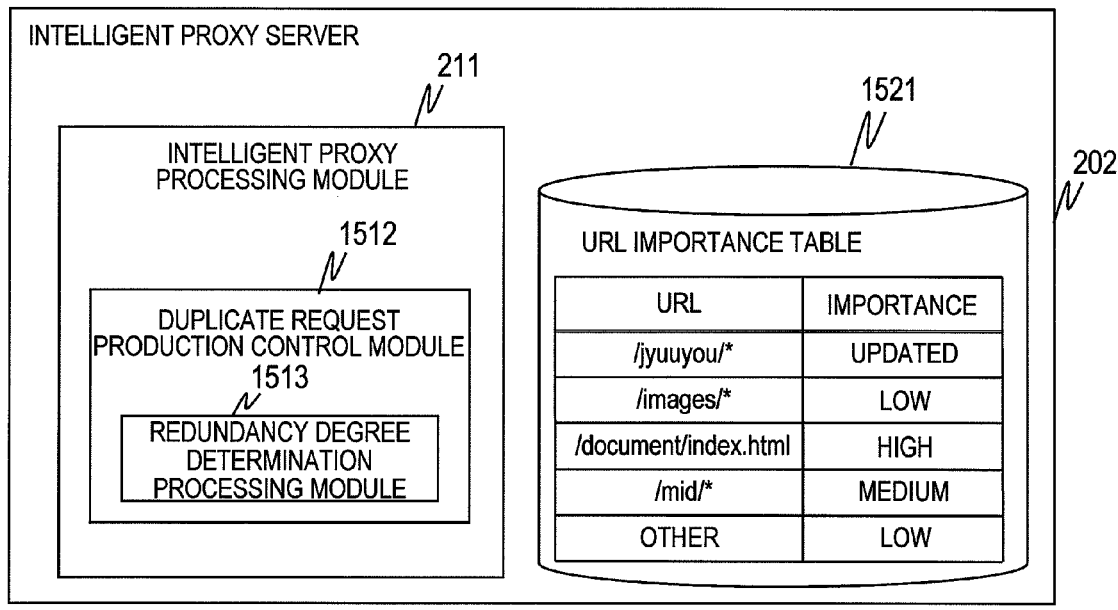
FIG. 14 an explanatory diagram illustrating a configuration for carrying out a method of dynamically determining a degree of redundancy based on importance of request URL according to the fifth embodiment of this invention.

(A) Method of Dynamically Determining Degree of Redundancy Based on Importance of Request URL FIG. 14 illustrates a configuration for carrying out a method of dynamically determining a degree of redundancy based on importance of request URL according to the fifth embodiment of this invention.

In the method of dynamically determining a degree of redundancy based on importance of request URL, a URL importance table 1521 illustrating importance of request URL's is stored in the intelligent proxy server 202.

The URL importance table 1521 is produced by a system administrator, and specifies importance for respective URL's. When a request includes an URL coincident with a URL of high importance, and is thus determined as important, the degree of redundancy is increased for the request, thereby increasing the reliability. On the other hand, the request is determined as low in importance, the degree of the redundancy is decreased for the request to increase resources available for processing other requests.

The method of dynamically determining a degree of redundancy based on importance of request URL is applied to a case in which the importance of an URL contained in a request received from a client computer has been recognized in advance. The URL importance table 1521 is an extended version of the update-type access presence/absence definition table 222 used for respective URL's according to the first embodiment.

The URL importance table 1521 illustrates correspondences between a URL contained in a request transmitted from the client computer 201 and importance. The levels of importance include, for example, information such as "high", "medium", "low", and "update".

A duplicate request production control module 1512 is an extended version of the duplicate request production control module 212 according to the first embodiment. Specifically, in the first embodiment, the duplicate request production control module 212 sets the degree of redundancy to 1 for "UPDATE", and sets a plurality of levels of redundancy otherwise, but the duplicate request production control module 1512 sets 1 for "UPDATE", and increases the importance stepwise according to the importance. A function used for determining the redundancy may be any function as long as it is set to increase the redundancy according to the importance.

In this way, according to the importance corresponding to a request URL contained in the request transmitted from the client computer 201, the degree of redundancy of the request can be changed.

Moreover, in the URL importance table 1521, instead of the information such as "high", "medium", and "low", levels of importance corresponding to request URL's may be directly set.

Further, the method of dynamically determining a degree of redundancy based on importance of request URL may also be applied to the second embodiment described above. However, the configuration does not permit the determination of the presence/absence of update-type access according to a request URL, and "UPDATE" is not set in the URL importance table 1521, and thus the degree of redundancy is always equal to or more than two.

(B) Method of Dynamically Determining Degree of Redundancy Based on System Load State In a state where a high load is imposed on the entire system, when a request having a high degree of redundancy is to be processed, the load on the entire system increases, which may result in a decrease in response performance. Thus, the degree of redundancy is dynamically controlled according to the load state of the entire system such that "the degree of redundancy is low when the load on the entire system is high", and "the degree of redundancy is high when the load on the entire system is low".

Figure 15:
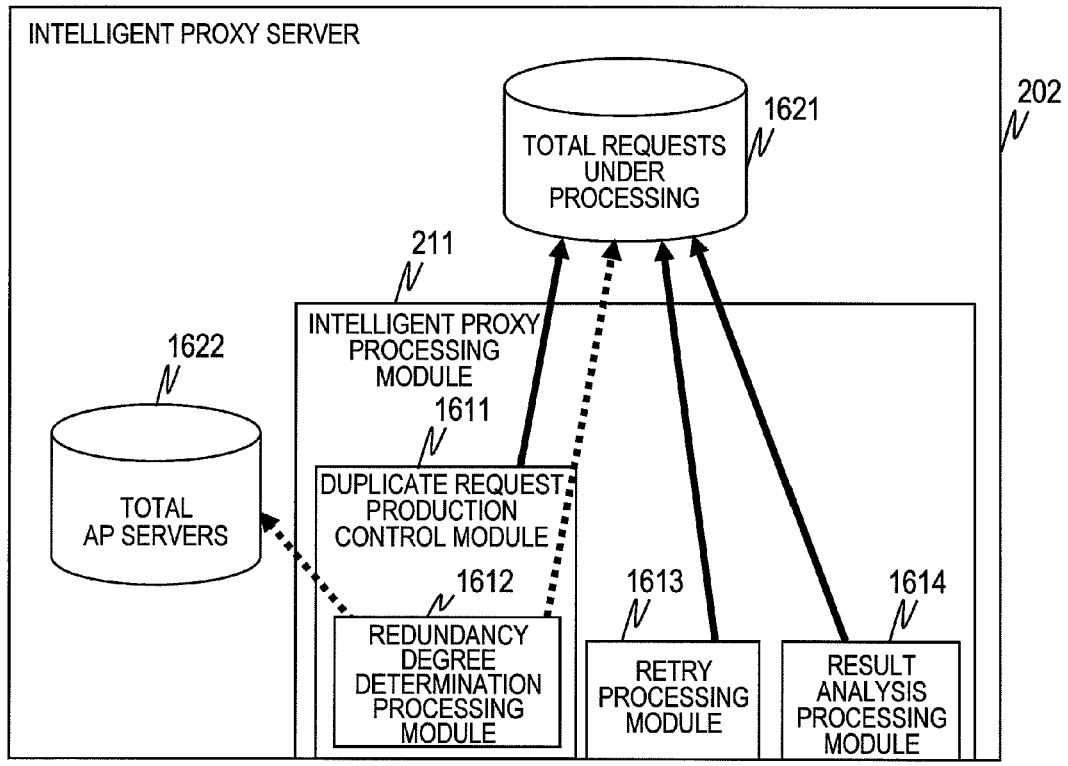
FIG. 15 an explanatory diagram illustrating a method of dynamically determining a degree of redundancy based on a system load state according to the fifth embodiment of this invention.

FIG. 15 describes the method of dynamically determining a degree of redundancy based on the system load state according to the fifth embodiment of this invention.

The intelligent proxy server 202 controls transmission/reception of duplicate requests inside the system. Thus, by adding a counter for total number of requests under processing 1621 for measuring the number of transmission/reception of duplicate requests to the intelligent proxy server 202, the total number of requests being processed presently by the application server programs 203 is obtained.

The intelligent proxy server 202 illustrated in FIG. 15 includes the counter for total number of requests under processing 1621 and a counter for total application server number 1622. The counter for total number of requests under processing 1621 stores the total number of request being processed presently. Moreover, the counter for total application server number 1622 stores the number of application server programs 203 in operation, which are not failed.

When a duplicate request production control module 1611 produces duplicate requests from a request received from the client computer 201, the duplicate request production control module 1611 adds the number of the duplicate requests to the count of the counter for total number of requests under processing 1621. When a result analysis processing module 1614 receives one result of processing, the result analysis processing module 1614 decrements the count of the counter for total number of requests under processing 1621 by one. When a retry processing module 1613 retries a request, the retry processing module 1613 increments the count of the counter for total number of requests under processing 1621 by one.

On this occasion, the load imposed on the entire system is approximated based on a ratio of the count of the counter for total number of requests under processing 1621 to the count of the counter for total application server number 1622. The redundancy degree determination processing module 1612 controls the degree of redundancy of a request such that the degree of redundancy is close to two for a high load, and the degree of redundancy is a possible large value for a low load.

A function for determining the degree of redundancy may be any function as long as it satisfies the above-mentioned property, and may be a function which "sets, when there are surplus application servers which are not processing requests, a half of the total number of the surplus application servers to the degree of redundancy, and sets, when the system load is high, two to the degree of redundancy". Specifically, the function is represented by the following equation.

$$\text{Degree of redundancy } M = \max(2, \text{ceiling}((Z-Y) \div 2)))$$

In this equation, Y represents the count of the counter for total number of requests under processing 1621, and Z represents the count of the counter for total application server number 1622. A function max (x,y) gives the larger one of x and y. A function ceiling (x) gives the smallest integer greater than or equal to x.

With the above-mentioned configuration, it is possible to dynamically control the degree of redundancy according to the state of the load imposed on the entire system.

(C) Method of Dynamically Determining Degree of Redundancy Based on "Tendency of Generation of Update-Type Access"

In the pruning of requests according to the second embodiment, duplicate requests are automatically pruned when an update-type access occurs, and only a request holding the update right is finally processed.

Thus, when a high possibility of generation of an update-type request can be recognized before the degree of redundancy is determined, it is desirable to reduce the degree of redundancy as much as possible for requests which do not hold the update right.

Figure 16:
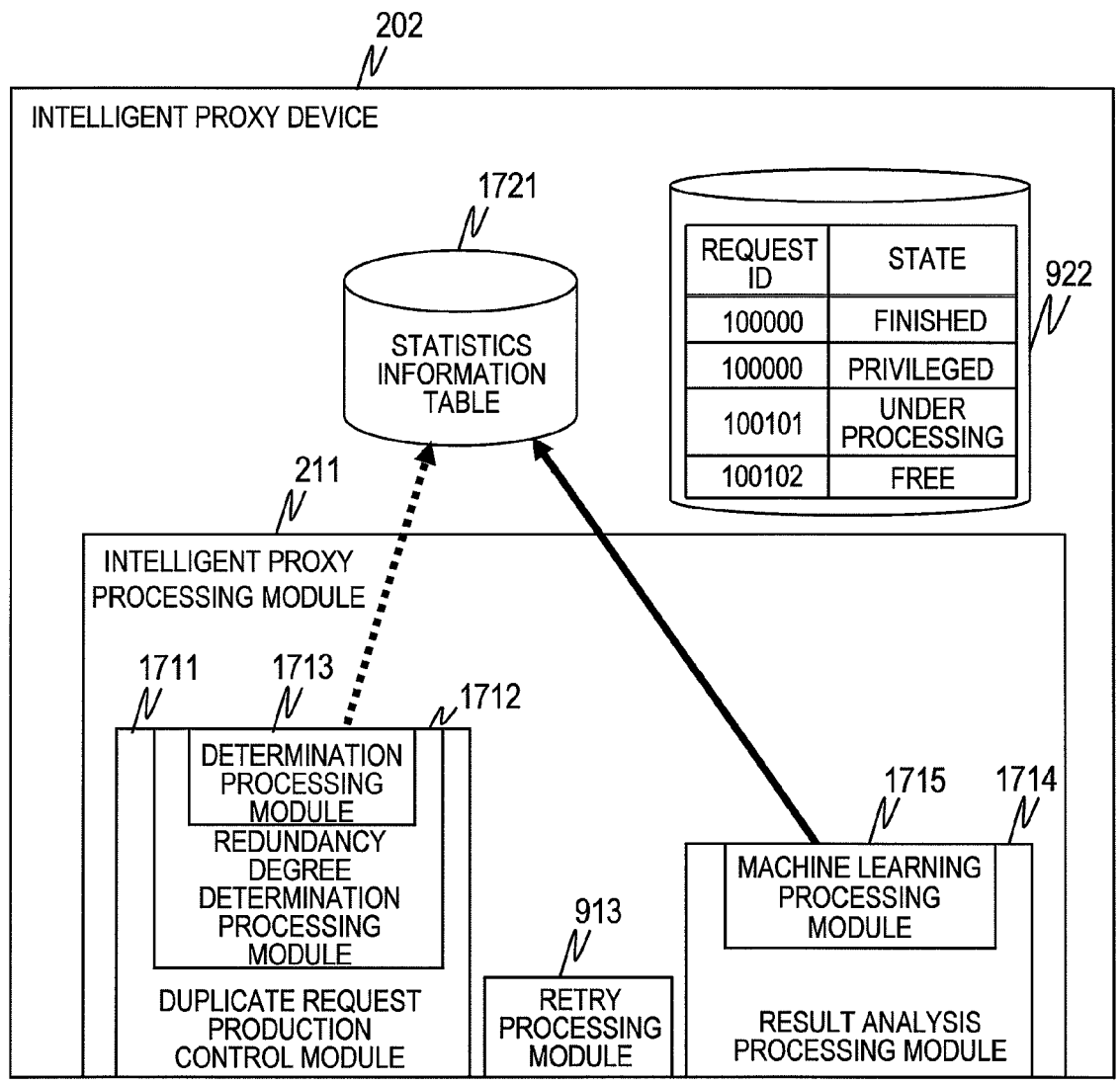
FIG. 16 an explanatory diagram illustrating a configuration for carrying out a method of dynamically determining a degree of redundancy based on statistical information according to the fifth embodiment of this invention.
Figure 17:
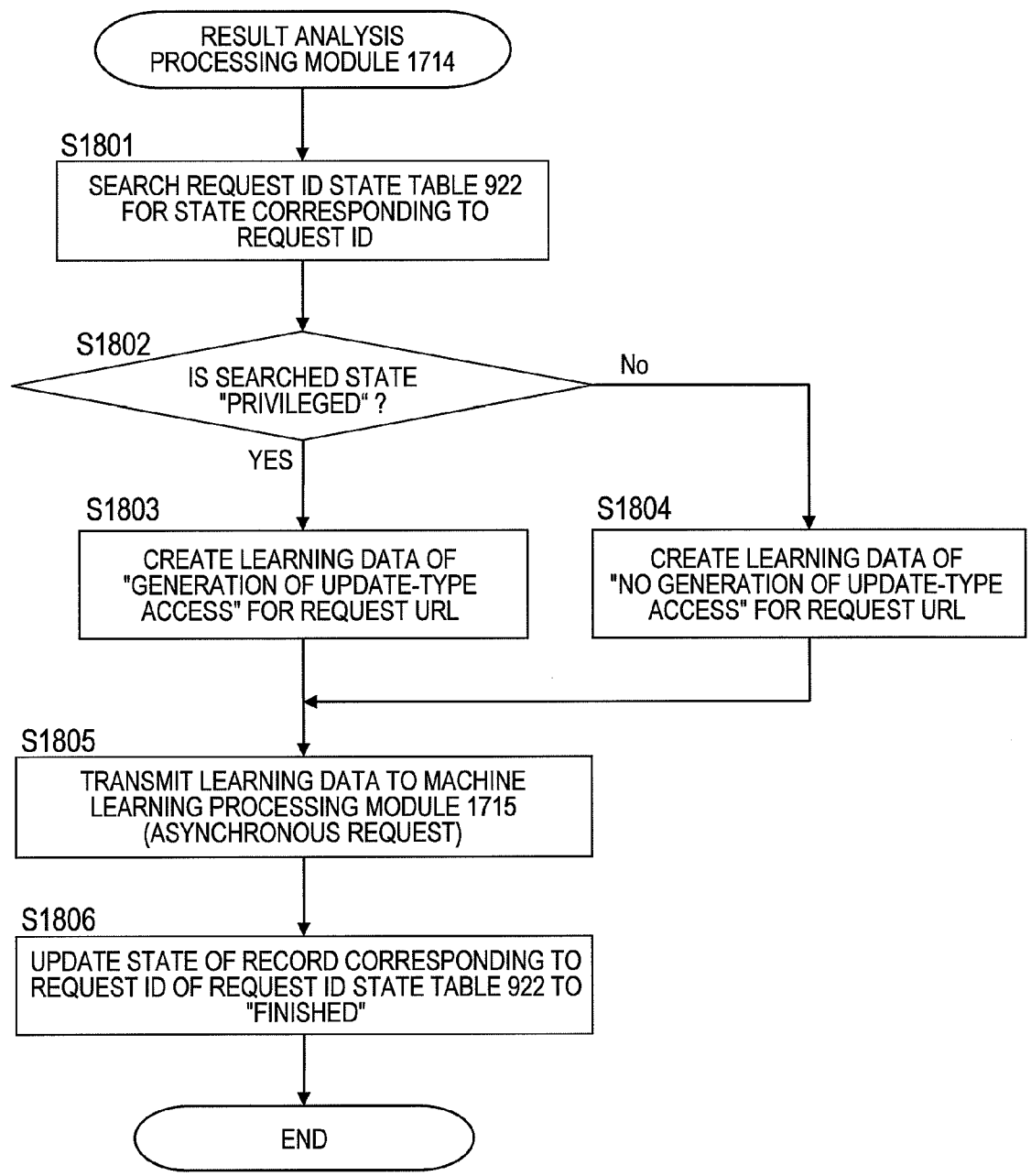
FIG. 17 is a flowchart illustrating processing steps carried out by a result analysis processing module for changing a state to "finished" in a request ID state table with right control according to the fifth embodiment of this invention.
Figure 18:
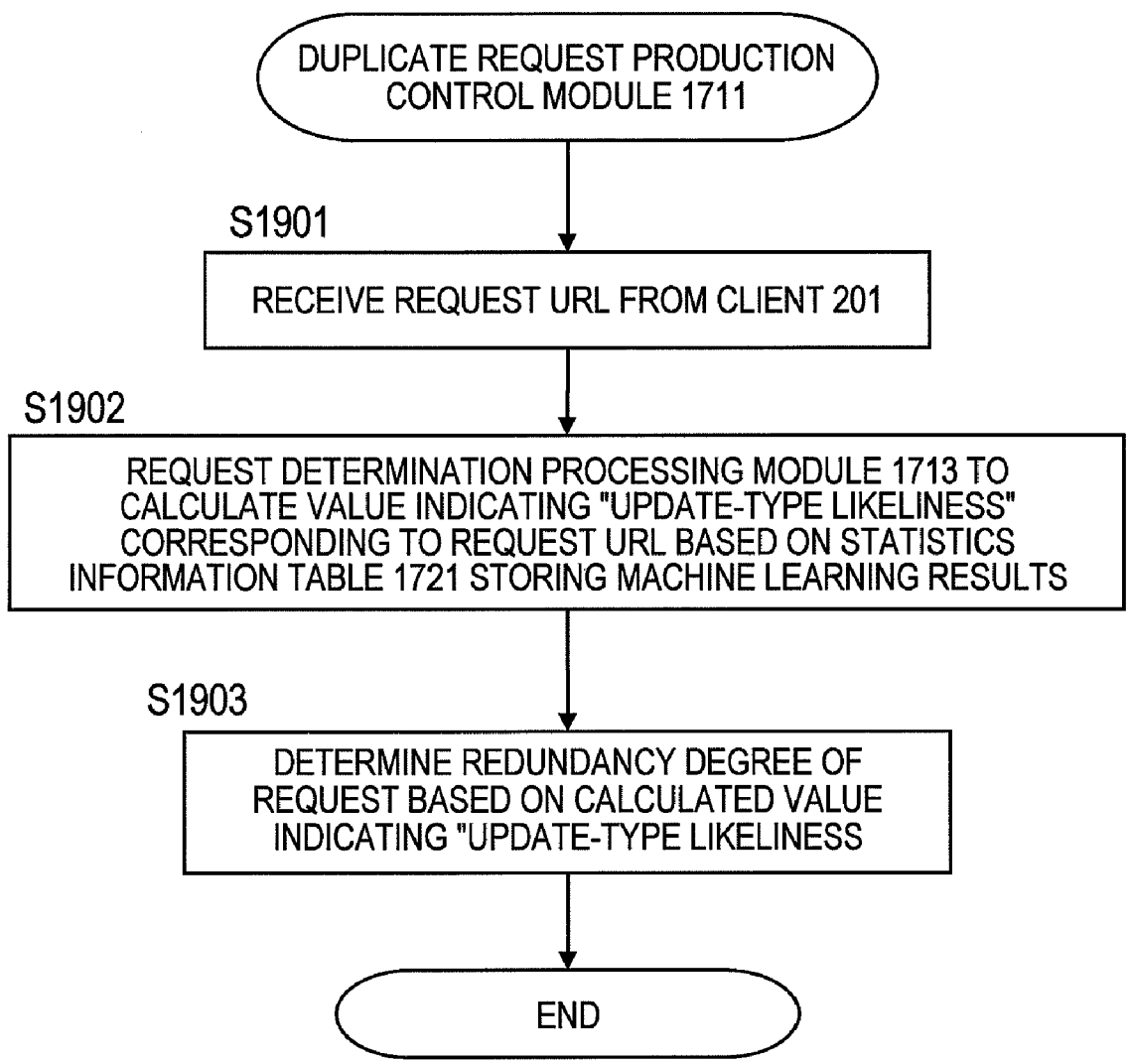
FIG. 18 is a flowchart illustrating processing steps carried out by a duplicate request production control module for determining a degree of redundancy according to the fifth embodiment of this invention.

Moreover, as assumed in the second embodiment, it is difficult to determine whether update-type access occurs according to an URL, which is input data, in an ordinary application server system. However, based on statistical information on request processing results, it is possible to estimate a tendency of generation of update-type access in the course of processing of a request for a specific URL. Referring to FIGS. 16 to 18, a description will now be given of the method of controlling the degree of redundancy based on statistical information on request processing results.

FIG. 16 illustrates a configuration for carrying out the method of dynamically determining a degree of redundancy based on statistical information according to the fifth embodiment of this invention.

In the fifth embodiment of this invention, the intelligent proxy processing module 211 includes a machine learning processing module 1715, a statistical information table 1721 storing results of machine learning, and a determination processing module 1713 for determining the "tendency of generation of update-type access" based on the statistical information table 1721.

Moreover, in the second embodiment, when an update-type access occurs, the generation of the update-type access is notified to the request ID state table with right control 922. Based on the request ID state table with right control 922, when the request processing has been finished, it is possible to recognize whether or not update-type access to an external system has occurred in the course of the processing of a corresponding request URL.

A result analysis processing module 1714 is an extended version of the result analysis processing module 914 according to the second embodiment. Steps for the extended processing are illustrated in FIG. 17.

FIG. 17 is a flowchart illustrating processing steps carried out by the result analysis processing module 1714 for changing a state to "finished" in the request ID state table with right control 922 according to the fifth embodiment of this invention.

When the CPU 321 of the intelligent proxy server 202 causes the result analysis processing module 1714 to change a state to "finished" in the request ID state table with right control 922, first, the CPU 321 searches, based on a request ID of a request to be processed, the request ID state table with right control 922 (S1801).

The CPU 321 of the intelligent proxy server 202 determines whether or not the state of the searched record is "privileged" before the change (S 1802). When the state before the change is "privileged" ("YES" in Step S1802), the CPU 321 notifies the machine learning processing module 1715 of generation of an update-type access on the request URL (S1803, S1805). When the state before the change is not "privileged" ("NO" in Step S1802), the CPU 321 notifies the machine learning processing module 1715 of absence of an update-type access on the request URL (S1804, S1805). Finally, the CPU 321 of the intelligent proxy server 202 causes the result analysis processing module 1714 to change the state to "finished" in the request ID state table with right control 922 (S1806). Subsequent processing is the same as the processing carried out by the result analysis processing module 214 according to the first embodiment.

The CPU 321 of the intelligent proxy server 202 causes the machine learning processing module 1715 to learn, by a statistical learning method, the tendency of generation of an update-type accesses to a request URL based on, as learning data, the information notified by the result analysis processing module 1714.

As the statistical learning method carried out by the machine learning processing module 1715, counters may be simply provided for the respective URL's, thereby obtaining frequencies of generation of update-type accesses to the respective URL's, or URL strings are vectorized according to the N-gram or the like, and high-level machine learning by the support vector machine and the neural network may be applied thereto. According to the first method, a request directed to an unknown URL cannot be correctly determined, but, according to the second method, a better estimation may be made even for a request directed to an unknown URL.

In the fifth embodiment of this invention, the statistical learning is employed, and hence it is not possible to certainly determine that "an update-type access will never occur". Therefore, the redundancy degree determination processing module 1712 assigns at least two of the degree of redundancy to a request to be processed.

A duplicate request production module 1711 is an extended version of the duplicate request production control module 912 according to the second embodiment. Steps for the extended processing are illustrated in FIG. 18.

FIG. 18 is a flowchart illustrating processing steps carried out by the duplicate request production control module 1711 for determining the degree of redundancy according to the fifth embodiment of this invention.

When the CPU 321 of the intelligent proxy server 202 receives a request from the client computer 201 (S1901), the CPU 321 inquires the determination processing unit 1713 about whether a request URL corresponding to the request tends to generate an update-type access, thereby obtaining information thereupon (S1902). The determination processing module 1713 calculates, based on the statistical information table 1721 storing the results of machine learning, the "tendency of generation of update-type access" for the request URL.

The CPU 321 of the intelligent proxy server 202 causes the redundancy degree determination module 1712 to set the degree of redundancy, based on the calculated data, to a value close to two when "update-type accesses tend to occur", or to a value larger than two when "reference-type accesses tend to occur" (S1903).

A function used to determine the degree of redundancy by the redundancy degree determination processing module 1712 may be any function as long as it sets the degree of redundancy to a value close to two when "update-type accesses tend to occur", and increase the degree of tendency when "reference-type accesses tend to occur". For example, the redundancy degree determination processing module 1712 may set the degree of redundancy to two when the tendency of generation of update-type access is equal to or more than a threshold, and may employ (A) the method of dynamically determining a degree of redundancy based on importance of request URL, or (B) the method of dynamically determining a degree of redundancy based on a system load state when the tendency of generation of update-type access is equal to or less than the threshold.

Processing subsequent to the determination of the degree of redundancy by the redundancy degree determination processing module 1712 is the same as the processing carried out by the duplicate request production control module 912 according to the second embodiment.

Through the above-mentioned processing, it is possible to obtain a better degree of redundancy for a request from which duplicate requests are produced by learning "tendency of generation of update-type access" according to a request URL.

According to the fifth embodiment of this invention, it is possible to determine the degree of redundancy for a request from which duplicate requests are produced based on a load imposed on application servers and the like. Thus, when a request tends to generate an update-type access, it is possible to determine a proper degree of redundancy according to the state of the load imposed on the system and the like.

While the present invention has been described in detail and pictorially in the accompanying drawings, the present invention is not limited to such detail but covers various obvious modifications and equivalent arrangements, which fall within the purview of the appended claims.

What is claimed is:

1. A request processing method of processing a request requesting task processing in a computer system,
    the computer system having a client computer for transmitting the request requesting task processing, a plurality of application servers for processing the request, a proxy server for receiving the request and transmitting the request to the plurality of application servers, and a session management server for managing the request,
    the proxy server having a first interface, a first processor coupled to the first interface, and a first memory coupled to the first processor,
    the plurality of application servers each having a second interface, a second processor coupled to the second interface, and a second memory coupled to the second processor,
    the request processing method comprising steps of:
        producing, by the proxy server, at least one duplicate request from an original request transmitted from the client computer, and transmitting the first request which is one of duplicate and original requests to each of the plurality of application servers;
        transmitting, by the plurality of application servers, a result of processing of the first requests to the proxy server;
        notifying, by the plurality of application servers, the session management server of session information including identifiers of the plurality of application servers and identifiers of the first requests;
        determining, by the proxy server, a result of the processing used for responding to the client computer upon receiving the result of the processing of the first requests;
        notifying, by the proxy server, the session management server of the identifiers of the plurality of application servers which have transmitted the determined processing result and an identifier of the request transmitted from the client computer;
        accessing, by the plurality of application servers, an external server storing data used for the task processing; and
        stopping, by the proxy server, processing for the first requests other than a first request for which the processing for update data stored in the external server has been completed first, when the original request transmitted from the client computer includes a request for updating data stored in the external server.

2. The request processing method according to claim 1, further comprising the steps of:
    accessing, by the plurality of application servers, an external server storing data used for the task processing;
    selecting, by the proxy server, one request from the first requests;
    assigning, by the proxy server, an update right to the selected request; and
    stopping, by the proxy server, processing a request to which the update right is not assigned upon processing for updating data stored in the external server according to the request transmitted from the client computer.

3. The request processing method according to claim 1, wherein:
    the plurality of application servers logically divide a computer resource of the plurality of application servers to provide virtual computers; and
    the first requests are processed by the virtual computers.

4. The request processing method according to claim 3, wherein:
    the request processing method further comprises the step of managing, by the proxy server, computer selection information including an order for selecting virtual computers for processing the first requests; and
    the computer selection information includes information on the order for selecting the virtual computers so as to balance number of request processed by each of the plurality of application servers providing the virtual computers.

5. The request processing method according to claim 3, wherein:
the virtual computers includes primary computers and secondary computers which has lower processing performance than the primary computer; and
the request processing method further comprises the steps of selecting, by the proxy server, one of the primary computers and at least one of the secondary computers, and transmitting the first requests to the selected one of the primary computers and the selected at least one of the secondary computers.

6. The request processing method according to claim 1, further comprising the step of:
managing, by the proxy server, load information of the plurality of application servers; and
determining, by the proxy server, a degree of redundancy of the first requests based on the load information.

7. The request processing method according to claim 1, further comprising the step of:
accumulating, by the proxy server, information on updating data stored in the external server, for each piece of access destination information included in the request transmitted from the client computer; and
determining, by the proxy server a degree of redundancy of the first requests based on the accumulated information.

8. A request processing method of processing a request requesting task processing in a computer system,
the computer system having a client computer for transmitting the request requesting task processing, a plurality of application servers for processing the request, a proxy server for receiving the request and transmitting the request to the plurality of application servers, and a session management server for managing the request,
the proxy server comprising a first interface, a first processor coupled to the first interface, and a first memory coupled to the first processor,
the plurality of application servers each having a computer resource comprising a second interface, a second processor coupled to the second interface, and a second memory coupled to the second processor, and logically dividing the computer resource to provide virtual computers,
the request processing method comprising the steps of:
producing, by the proxy server, at least one duplicate request from an original request transmitted from the client computer, and transmitting the first request which is one of duplicate and original requests to each of the virtual computers provided by the plurality of application servers;
transmitting, by the virtual computer, a result of processing of the first requests to the proxy server;
notifying, by the virtual computer, the session management server of session information including identifiers of the virtual computers and identifiers of the first requests;
determining, by the proxy server, a result of the processing used for responding to the client computer upon receiving the result of the processing of the first requests; and notifying, by the proxy server, the session management server of an identifier of the virtual computer which has transmitted the determined processing result and an identifier of the request transmitted from the client computer;
accessing, by the plurality of application servers, an external server storing data used for the task processing; and
stopping, by the proxy server, processing for the first requests other than a first request for which the processing for update data stored in the external server has been completed first, when the original request transmitted from the client computer includes a request for updating data stored in the external server.

9. A computer system comprising:
a client computer for transmitting a request requesting task processing;
a plurality of application servers for processing the request;
a proxy server for receiving the request and transmitting the request to the plurality of application servers; and
a session management server for managing the request, wherein:
the proxy server comprises a first interface, a first processor coupled to the first interface, and a first memory coupled to the first processor;
the plurality of application servers each comprise a second interface, a second processor coupled to the second interface, and a second memory coupled to the second processor;
the proxy server is configured to:
produce at least one duplicate requests from an original request transmitted from the client computer; and
transmit the first request which is one of duplicate and original requests to each of the plurality of application servers;
the plurality of application servers configured to:
transmit a result of processing of the first requests to the proxy server; and
notify the session management server of session information including identifiers of the plurality of application servers and identifiers of the first requests;
the proxy server further configured to:
determine a result of the processing used for responding to the client computer upon receiving the result of the processing of the first requests; and
notify the session management server of the identifiers of the plurality of application servers which have transmitted the determined processing result and an identifier of the request transmitted from the client computer,
the plurality of application servers further configured to access an external server storing data used for the task processing,
the proxy server further configured to stop processing for the first requests other than a first request for which the processing for update data stored in the external server has been completed first, when the original request transmitted from the client computer includes a request for updating data stored in the external server.

* * * * *